(12) United States Patent
Matsumoto et al.

(10) Patent No.: US 8,687,864 B2
(45) Date of Patent: Apr. 1, 2014

(54) IMAGE DIAGNOSTIC PROCESSING DEVICE AND IMAGE DIAGNOSTIC PROCESSING PROGRAM

(75) Inventors: Sumiaki Matsumoto, Kobe (JP); Hitoshi Yamagata, Otawara (JP)

(73) Assignees: National University Corporation Kobe University, Kobe-shi (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/350,458

(22) Filed: Jan. 13, 2012

(65) Prior Publication Data

US 2012/0141004 A1 Jun. 7, 2012

Related U.S. Application Data

(60) Division of application No. 11/736,865, filed on Apr. 18, 2007, now Pat. No. 8,121,373, which is a continuation of application No. PCT/JP2006/303597, filed on Feb. 27, 2006.

(30) Foreign Application Priority Data

Mar. 1, 2005 (JP) ................................. 2005-056098

(51) Int. Cl.
*G06K 9/00* (2006.01)
(52) U.S. Cl.
USPC ............ 382/128; 382/131; 382/132; 382/133
(58) Field of Classification Search
USPC .................. 382/128, 131, 132, 133
See application file for complete search history.

(56) References Cited

U.S. PATENT DOCUMENTS

| | | | |
|---|---|---|---|
| 6,728,334 B1 * | 4/2004 | Zhao | 378/62 |
| 6,738,499 B1 | 5/2004 | Doi et al. | |
| 6,909,797 B2 | 6/2005 | Romsdahl et al. | |
| 7,274,810 B2 * | 9/2007 | Reeves et al. | 382/128 |
| 7,773,791 B2 | 8/2010 | Simon et al. | |
| 2004/0120561 A1 * | 6/2004 | Goto | 382/128 |
| 2005/0084178 A1 | 4/2005 | Lure et al. | |
| 2005/0259854 A1 | 11/2005 | Arimura et al. | |

FOREIGN PATENT DOCUMENTS

| | | |
|---|---|---|
| JP | 2002-10062 | 1/2002 |
| JP | 2002-325762 A | 11/2002 |
| JP | 2004-41490 | 2/2004 |
| JP | 2005-40490 | 2/2005 |

OTHER PUBLICATIONS

Shiying Hu, et al., Automatic Lung Segmentation for Accurate Quantitation of Volumetric X-Ray CT Images, IEEE Transactions on Medical Imaging, vol. 20, No. 6, Jun. 2001, pp. 490-498.

(Continued)

*Primary Examiner* — Tom Y Lu
(74) *Attorney, Agent, or Firm* — Oblon, Spivak, McClelland, Maier & Neustadt, L.L.P.

(57) ABSTRACT

An image diagnostic processing device includes peripheral region specifying means which specifies a peripheral region connecting to an abnormal candidate region included in an image representing the inside of a subject, and judging means which judges whether the abnormal candidate region is an anatomic abnormal region or not, based on a first feature quantity of the abnormal candidate region and a second feature quantity of the peripheral region.

15 Claims, 30 Drawing Sheets

(56) References Cited

OTHER PUBLICATIONS

Siddharth Manay, et al., "Anti-Geometric Diffusion for Adaptive Thresholding and Fast Segmentation", IEEE Transactions on Image Processing, vol. 12, No. 11, Nov. 2003, pp. 1310-1323.

Lawrence H. Staib, et al., "Model-Based Deformable Surface Finding for Medical Images", IEEE Transactions on Medical Imaging, vol. 15, No. 5, Oct. 1996, pp. 720-731.

David S. Paik, et al., "Surface Normal Overlap: A Computer-Aided Detection Algorithm with Application to Colonic Polyps and Lung Nodules in Helical CT", IEEE Transactions on Medical Imaging, vol. 23, No. 6, Jun. 2004, pp. 661-675.

Sumiaki Matsumoto, "Diminution index: A novel 3D feature for pulmonary nodule detection", International Congress Series, vol. 1281, XP-005081826, May 1, 2005, pp. 1093-1098.

Masahito Aoyama, et al. "Computerized scheme for determination of the likelihood measure of malignancy for pulmonary nodules on low-dose CT images", Medical Physics, vol. 30, No. 3, XP-012012009, Mar. 1, 2003, pp. 387-394.

Yoshito Mekada, et al., "A Concentration Index for Analyzing Three-Dimensional Line Patterns and Its Application to X-ray CT Images", Electronics and Communications in Japan, Part 3, vol. 81, No. 7, XP-000832211, Jul. 1, 1998, pp. 7-17.

Hidetaka Arimura, et al., "Computerized Scheme for Automated Detection of Lung Nodules in Low-Dose Computed Tomography Images for Lung Cancer Screening", Academic Radiology, vol. 11, No. 6, XP-009108666, Jun. 1, 2004, pp. 617-629.

Japanese Office Action issued Apr. 24, 2012 in patent application No. 2010-173670 with English translation.

\* cited by examiner

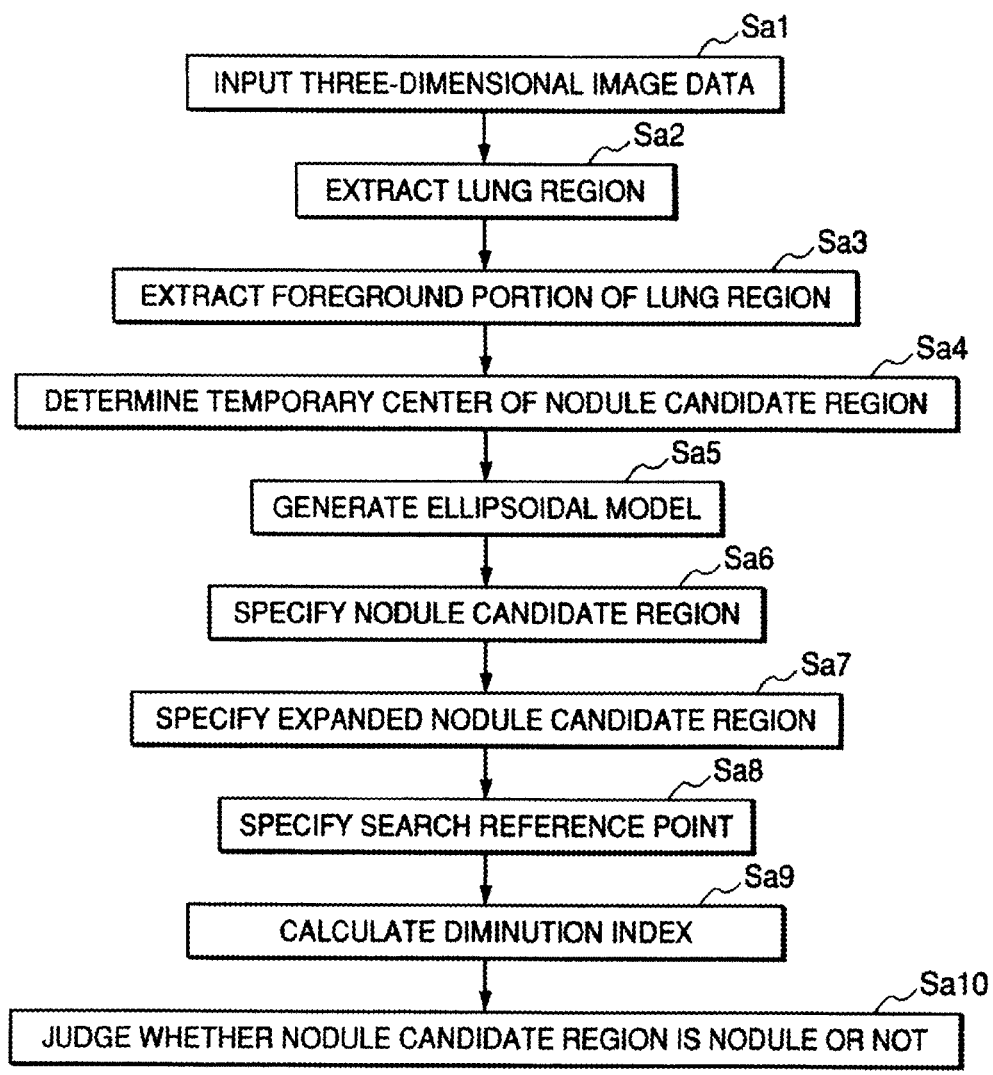

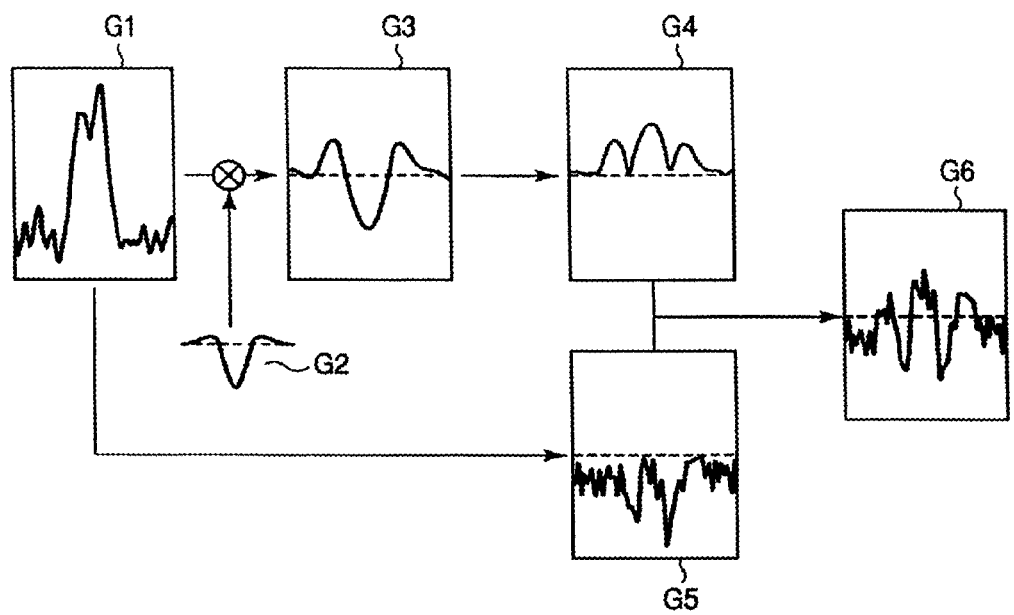

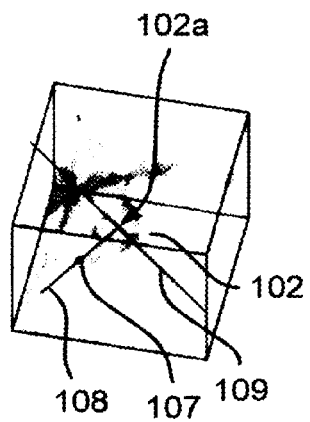 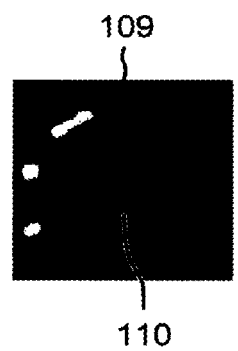 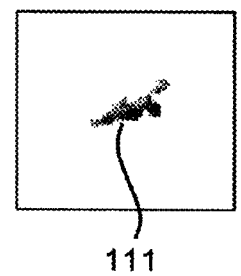
FIG.11A  FIG.11B  FIG.11C
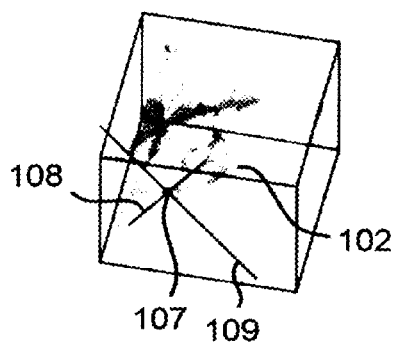  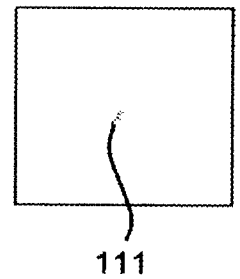
FIG.12A  FIG.12B  FIG.12C

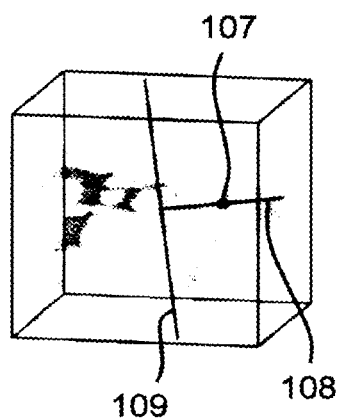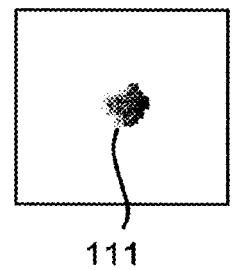
FIG.13A  FIG.13B  FIG.13C
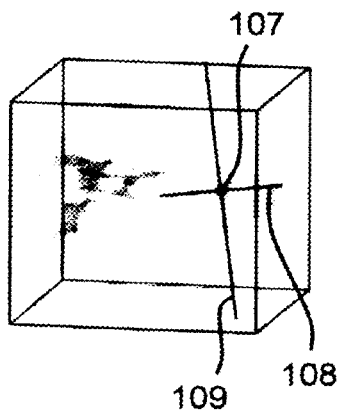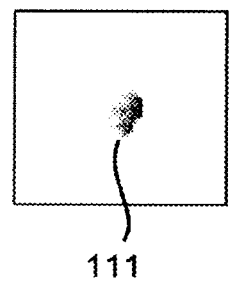
FIG.14A  FIG.14B  FIG.14C

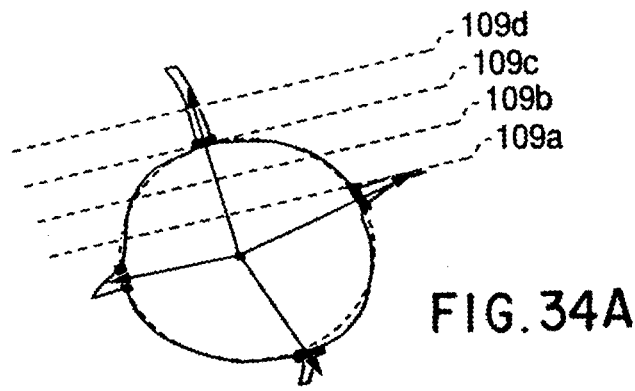
FIG.34A
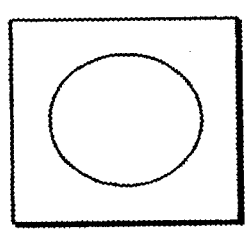 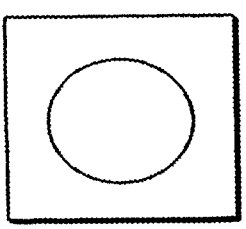 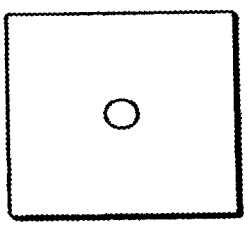 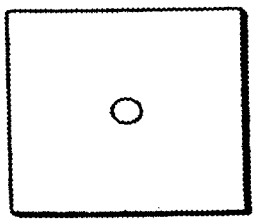
FIG.34B    FIG.34C    FIG.34D    FIG.34E
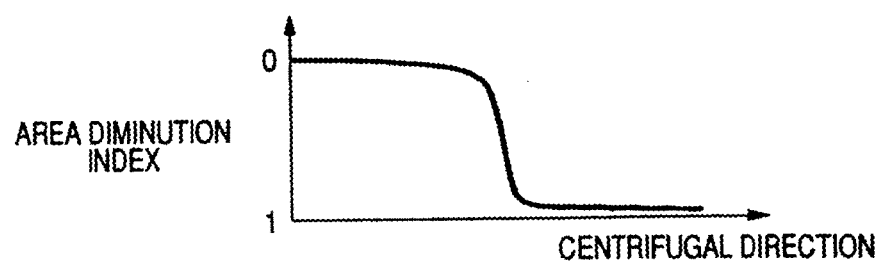
FIG.34F FIG. 35
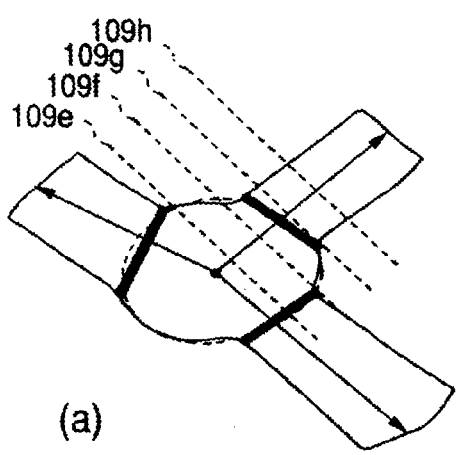
(a)
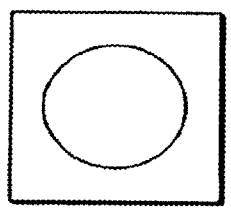  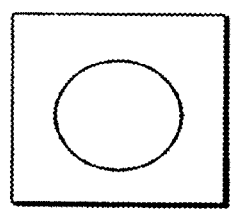  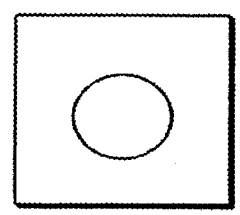  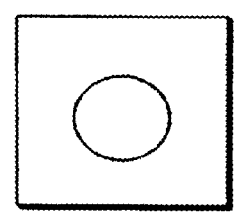
(b)　　　　(c)　　　　(d)　　　　(e)
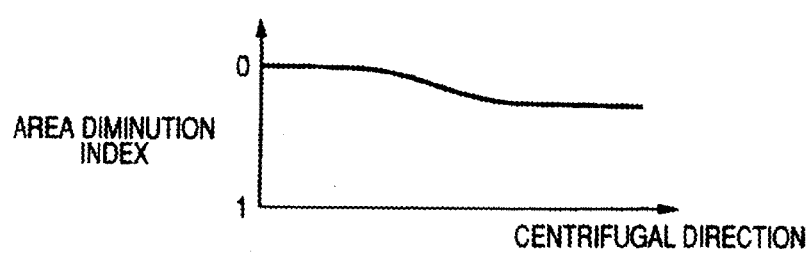
(f)

(a)            (b)            (c)

IMAGE DIAGNOSTIC PROCESSING DEVICE AND IMAGE DIAGNOSTIC PROCESSING PROGRAM

CROSS-REFERENCE TO RELATED APPLICATIONS

This application is a division of and claims the benefit of priority under 35 U.S.C. §120 from U.S. Ser. No. 11/736,865 filed Apr. 18, 2007, the entire contents of which is incorporated herein by reference. U.S. Ser. No. 11/736,865 is a National Stage of PCT/JP2006/303597 filed Feb. 27, 2006, which was published under PCT Article 21(2) in Japanese and claims the benefit of priority from Japanese Patent Application No. 2005-056098 filed Mar. 1, 2005.

BACKGROUND OF THE INVENTION

1. Field of the Invention

The present invention relates to an image diagnostic processing device and an image diagnostic processing program which performs a diagnostic process on anatomic abnormality such as nodule abnormality or wen abnormality in a three-dimensional image collected using a medical image diagnostic modality such as an X-ray computed tomographic imaging device, an X-ray diagnostic device, a magnetic resonance imaging device or an ultrasonic diagnostic device.

2. Description of the Related Art

Now, as lung cancer is the top cause of cancer death and is being increased in Japan, social demand for preventive medicine by smoking countermeasures and early detection has increased. In municipalities of Japan, an examination for lung cancer using a chest plain X-ray film and sputum cytodiagnosis has been performed, but, in a report "study group on effectiveness evaluation of an examination for cancer" of Ministry of Health and Welfare of Japan, published in 1998, the effect of the existing examination for the lung cancer is obtained, but is insignificant. In an X-ray computed tomography (hereinafter, referred to as CT), lung-field type lung cancer can be more easily detected than a chest plain X-ray film. However, before 1990, at which time a helical scanning type CT was developed, the CT cannot be used in the examination for cancer because imaging time is long. Shortly after the helical CT is developed, imaging method using relatively low X-ray tube current (hereinafter, referred to as a low dose helical CT) was developed so as to reduce exposed dose and pilot study on the examination for lung cancer using this method was made in Japan and the united states of America. As a result, it is verified that the low dose helical CT has a lung-cancer detection ratio significantly higher than that of the chest plain X-ray film.

Meanwhile, imaging time in the helical CT has been continuously reduced by multiple-row of the CT detector since 1998 and, in a recent multi-detector row helical CT, a whole lung image can be acquired within ten seconds with isotropic resolution less than 1 mm. The technical improvement of the CT enables us to detect smaller lung cancers. However, since the multi-detector row helical CT generates several hundreds of images per one scan, a burden required for interpretation of the images significantly increases.

Under such circumstances, in order to establish the low dose helical CT as a method of examining lung cancer, it is widely known that a computer assisted diagnosis (hereinafter, referred to as CAD) for preventing lung cancer from being overlooked is necessary. Since small lung-field-type lung cancer appears on a CT image as nodule-shaped abnormality, automatic detection of abnormality (hereinafter, referred to as automatic detection of a CT lung nodule) is of importance and various studies have been made since 1990s (for example, see "David S. Paik, et al., "Surface Normal Overlap: A Computer-Aided Detection Algorithm With Application to Colonic Polyps and Lung Nodules in Helical CT", IEEE TRANSACTIONS ON MEDICAL IMAGING, Vol. 23, No. 6, June 2004, p 661-675").

BRIEF SUMMARY OF THE INVENTION

With respect to the automatic detection of the CT lung nodule, an approach for extracting a region which becomes a nodule candidate (hereinafter, referred to as a nodule candidate region), obtaining a plurality of feature quantities for characterizing the nodule candidate region and judging whether the nodule candidate region is a nodule or not based on the feature quantities may be used. However, since the nodule is similar to a portion of the lung blood vessel in the feature, the nodule and the lung blood vessel may not be accurately discriminated by the feature quantities for characterizing the nodule candidate region.

The present invention is contrived in consideration of such circumferences, and it is an object of the present invention to determine whether an abnormal candidate region included in an image representing the inside of a subject is anatomic abnormality such as a nodule or not with high accuracy.

According to a first aspect of the present invention, there is provided an image diagnostic processing device including: peripheral region specifying means which specifies a peripheral region connecting to an abnormal candidate region included in an image representing the inside of a subject; and judging means which judges whether the abnormal candidate region is an anatomic abnormal region or not, based on a first feature quantity of the abnormal candidate region and a second feature quantity of the peripheral region.

According to a second aspect of the present invention, there is provided an image diagnostic processing device including judging means which judges whether an abnormal candidate region is an anatomic abnormal region or not, based on a first feature quantity of a first comparison region substantially including the abnormal candidate region included in an image representing the inside of a subject and including a region other than the abnormal candidate region and a second feature quantity of a second comparison region which substantially matches with the abnormal candidate region or is substantially included in the abnormal candidate region.

According to a third aspect of the present invention, there is provided an image diagnostic processing device including: means which specifies a region corresponding to a structure which overlaps or connects to an abnormal candidate region included in an image representing the inside of a subject; means which obtains a direction for three-dimensionally searching for the region corresponding to the structure; means which obtains feature quantities corresponding to a plurality of positions in the search direction; and means which judges whether the abnormal candidate region is an anatomic abnormal region or not, based on the feature quantities of the plurality of positions.

According to a fourth aspect of the present invention, there is provided an image diagnostic processing device which judges whether an anatomic abnormal region exists in an image representing the inside of a subject, including: thresholding processing means which processes the image using some threshold values; means which generates a penalty image from the image processed by the thresholding process means; and means which fits a spherical or ellipsoidal model to the penalty image and determines the abnormal candidate region including ground glass opacity.

According to a fifth aspect of the present invention, there is provided an image diagnostic processing program for allowing a computer to function as peripheral region specifying means which specifies a peripheral region connecting to an abnormal candidate region included in an image representing the inside of a subject; and judging means which judges whether the abnormal candidate region is an anatomic abnormal region or not, based on a first feature quantity of the abnormal candidate region and a second feature quantity of the peripheral region.

According to a sixth aspect of the present invention, there is provided an image diagnostic processing program for allowing a computer to function as judging means which judges whether an abnormal candidate region is an anatomic abnormal region or not, based on a first feature quantity of a first comparison region substantially including the abnormal candidate region included in an image representing the inside of a subject and including a region other than the abnormal candidate region and a second feature quantity of a second comparison region which substantially matches with the abnormal candidate region or is substantially included in the abnormal candidate region.

BRIEF DESCRIPTION OF THE SEVERAL VIEWS OF THE DRAWING

FIG. 2 is a flowchart schematically showing a process of detecting a nodule in the computer-aided image diagnostic processing device shown in FIG. 1.

FIG. 5 is a view explaining a process of synthesizing a penalty image.

FIG. 6 is a view explaining a process of deforming the ellipsoidal model.

FIG. 11 is a view showing a state of searching for the expanded nodule candidate region.

FIG. 12 is a view showing a state of searching for the expanded nodule candidate region.

FIG. 13 is a view showing a state of searching for the expanded nodule candidate region.

FIG. 14 is a view showing a state of searching for the expanded nodule candidate region.

FIG. 34 is a view showing a process of judging whether a nodule candidate region is a nodule by referring to an area diminution index.

FIG. 35 is a view showing a process of judging whether the nodule candidate region is the nodule by referring to the area diminution index.

DETAILED DESCRIPTION OF THE INVENTION

Hereinafter, embodiments of the present invention will be described with reference to the accompanying drawings.

First Embodiment

Figure 1:
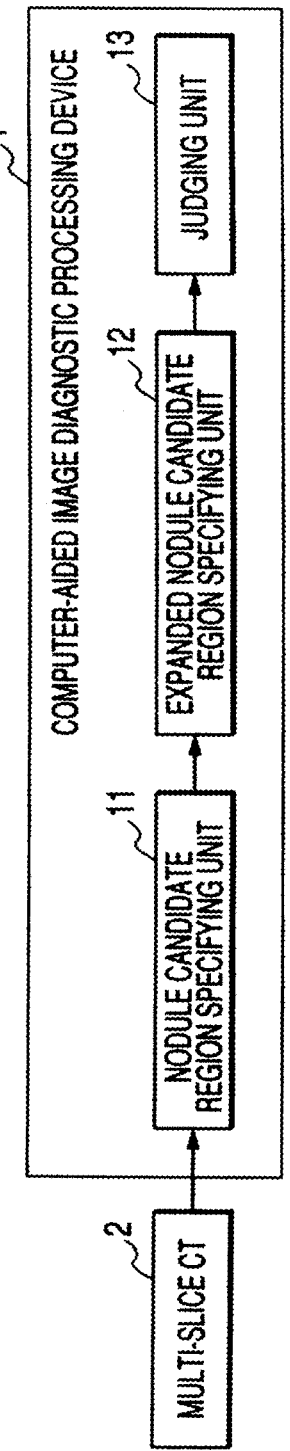
FIG. 1 is a view showing the configuration of a computer-aided image diagnostic processing device according to a first embodiment using an image diagnostic processing device according to the present invention.

FIG. 1 is a view showing the configuration of a computer-aided image diagnostic processing device 1 according to a first embodiment using an image diagnostic processing device according to the present invention.

The computer-aided image diagnostic processing device 1 shown in FIG. 1 processes three-dimensional image data acquired by a multi-slice CT 2. As shown in FIG. 1, the computer-aided image diagnostic processing device 1 includes a nodule candidate region specifying unit 11, an expanded nodule candidate region specifying unit 12 and a judging unit 13.

The computer-aided image diagnostic processing device 1 can, for example, use a general-purpose computer device as basic hardware. The nodule candidate region specifying unit 11, the expanded nodule candidate region specifying unit 12 and the judging unit 13 can be embodied by executing an image diagnostic processing program on a processor mounted in the computer device. At this time, the computer-aided image diagnostic processing device 1 may be embodied by previously installing the image diagnostic processing program in the computer device or by recording the image diagnostic processing program in a magnetic disc, a magnetic optical disc, an optical disc, a semiconductor memory or the like or distributing the image diagnostic processing program over a network and installing the image diagnostic processing program in the computer device. A portion or all of the above-described units may be embodied by hardware such as a logic circuit. Each of the above-described units may be embodied by combining hardware and software.

The nodule candidate region specifying unit 11 specifies a region which may become a nodule in an image to be processed, which is represented by the three-dimensional image data (hereinafter, referred to as an image to be processed). The expanded nodule candidate region specifying unit 12 specifies an expanded nodule candidate region in the image to be processed. The expanded nodule candidate region includes the nodule candidate region and a peripheral region connecting thereto. The judging unit 13 judges whether the nodule candidate region is a nodule or not, based on the respective feature quantities of the nodule candidate region and the peripheral region.

Next, the operation of the computer-aided image diagnostic processing device 1 configured above will be described.

FIG. 2 is a flowchart schematically showing a process of detecting the nodule in the computer-aided image diagnostic processing device 1. Steps Sa1 to Sa6 denote a process performed by the nodule candidate region specifying unit 11. A step Sa1 denotes a process performed by the expanded nodule candidate region specifying unit 12. Steps Sa8 to Sa10 denote a process preformed by the judging unit 13.

First, a whole lung image including the lung of a subject to be diagnosed is acquired by a multi-slice CT 2.

In a step Sa1, the nodule candidate region specifying unit 11 receives the three-dimensional image data acquired by the multi-slice CT 2.

In a step Sa2, the nodule candidate region specifying unit 11 segments a region corresponding to the lung from the image to be processed, which is represented by the three-dimensional image data. This process may, for example, use the existing method. The existing method is disclosed in "Hu S, Hoffman E A, Reinhardt J M. Automatic lung segmentation for accurate quantitation of volumetric X-ray CT images, IEEE Trans Med Imaging 2001; 20: 490-498".

Figure 3A:
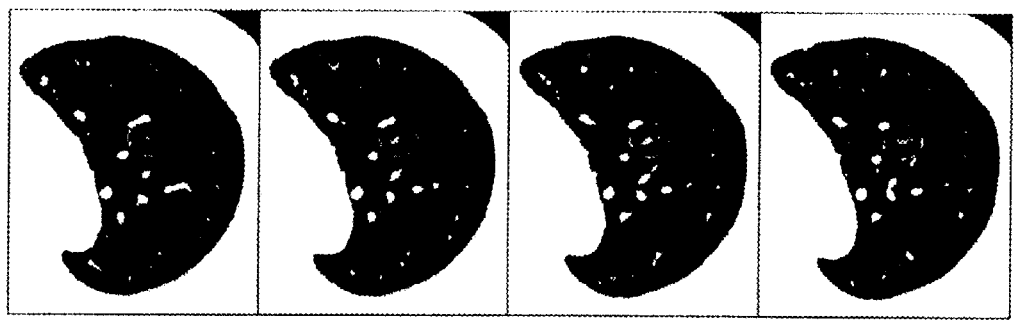
FIG. 3 is a view showing an image represented by three-dimensional image data acquired by a multi-slice CT shown in FIG. 1 and an image of a foreground portion divided from the image.
Figure 3B:

In a step Sa3, the nodule candidate region specifying unit 11 segments the lung region obtained in the step Sa2 into a foreground portion corresponding to lung blood vessel and nodules and a background portion corresponding to the other portion. This process may, for example, use the existing adaptive thresholding process. The adaptive thresholding process is disclosed in "Manay S, Yezzi A, Antigeometric diffusion for adaptive thresholding and fast segmentation. IEEE Trans Image Processing 2003; 12:1310-1323". FIG. 3(a) is a view showing the image to be processed, which is acquired by the multi-slice CT 2. FIG. 3(b) is a view showing the image of the foreground portion segmented from the image to be processed, shown in FIG. 3(a). The nodule exists in a circle in FIG. 3(a). The black range of FIG. 3(b) corresponds to the lung region and a white region in the lung region corresponds to the foreground portion of the lung region.

Figure 4:
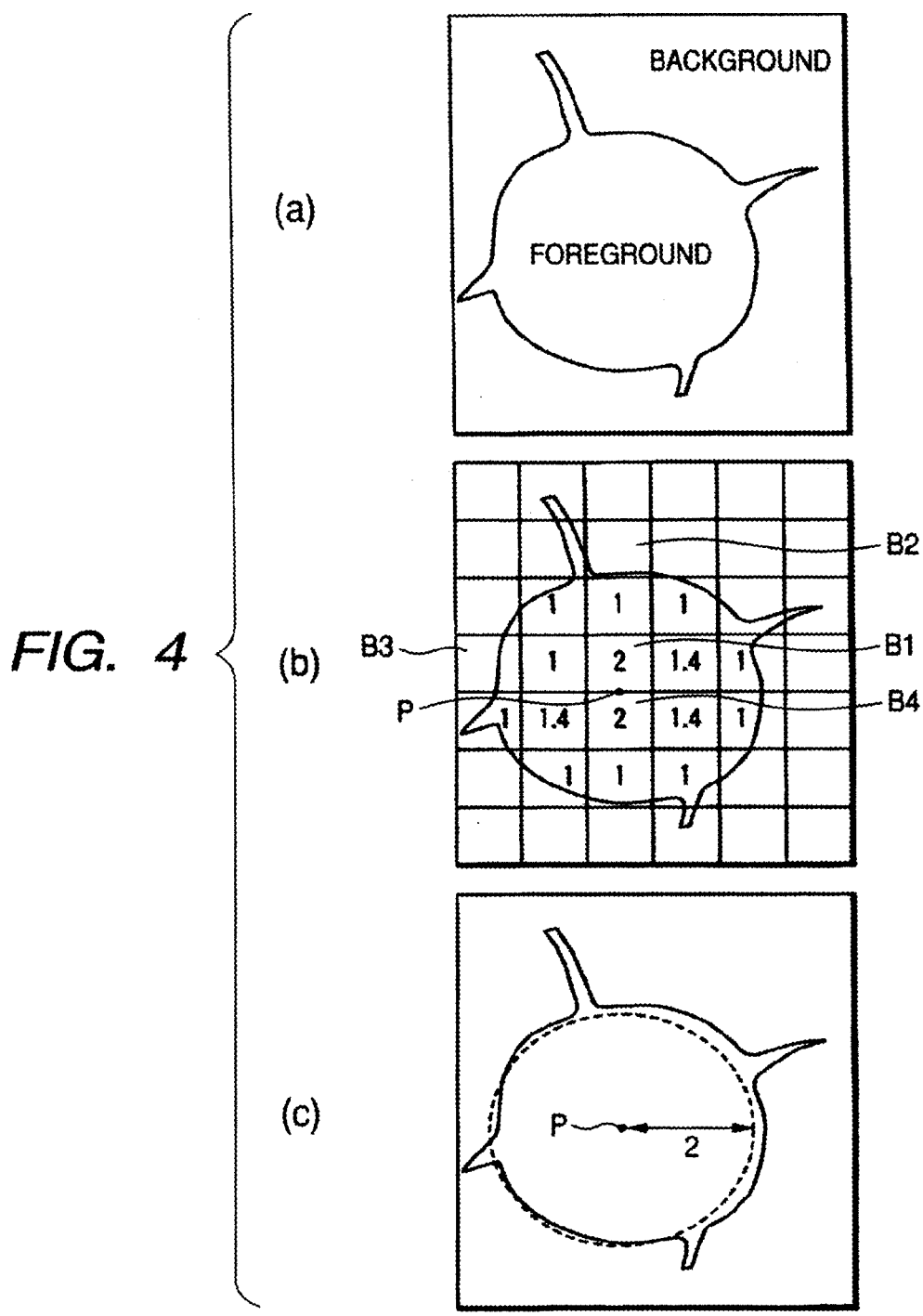
FIG. 4 is a view explaining a process of generating an ellipsoidal model.

In a step Sa4, the nodule candidate region specifying unit 11 determines a temporary center which may become the center of the nodule candidate region. First, the nodule candidate region specifying unit 11 transforms the value of each voxel belonging to the foreground portion into the value of a shortest distance from each voxel to a voxel belonging to the background portion. For example, when focusing attention on a region including the foreground portion having a shape shown in FIG. 4(a), a voxel B1 shown in FIG. 4(b) belongs to the foreground portion. Voxels B2 and B3 belong to the background portion and are closest to the voxel B1. The distance between the voxel B1 and the voxel B2 or B3 (distance between central points) is about 2 voxels. Here, it is assumed that the value of the voxel B1 is "2", as shown in FIG. 4(b). As a result, as shown in FIG. 4(b), the image is transformed into an image of which the value increases toward the inside of the foreground portion. The nodule candidate region specifying unit 11 determines a point having a maximum value after distance transformation as the temporary center. When the number of the voxels having the maximum value is only one, the voxel point of the voxel becomes the temporary center. When the number of the voxels having the maximum value is at least two, a centroid position of the voxel points of the voxels becomes the temporary center. For example, in FIG. 4(b), since both the voxel B1 and the voxel B4 have the maximum value, the centroid (middle point) P of the voxel points of the voxels B1 and B4 is the temporary center. In general, a plurality of foreground portions which may be the nodule exists in the image of the lung region. The nodule candidate region specifying unit 11 determines the respective temporary centers of the plurality of foreground portions.

The following processes are performed with respect to each of the plurality of temporary centers and are the same. Accordingly, the process on one temporary center will be described in the following description.

In a step Sa5, the nodule candidate region specifying unit 11 generates an ellipsoidal model including the temporary center. More specifically, first, the nodule candidate region specifying unit 11 prepares the ellipsoidal model which is initialized by a sphere centered on the temporary center and having the maximum value after the distance transformation as a radius. FIG. 4(c) is a view showing the ellipsoidal model having the temporary center P determined in FIG. 4(b). In FIG. 4(c), the section of the ellipsoidal model is shown by a dotted line. The nodule candidate region specifying unit 11 deforms the ellipsoidal model based on information on the image. The ellipsoidal model may be deformed using the existing method. This method is disclosed in "Staib L H, Duncan J S. Model-based deformable surface finding for medical images, IEEE Trans Med Imaging 1996; 15: 720-731". This method relates to the deformation of a Fourier curved surface of a general three-dimensional image. The ellipsoid is a simplest Fourier closed curved surface. The ellipsoidal model is deformed using the above-described method such that the size of the intensity gradient of the given three-dimensional image with a minus sign is set to a penalty image and the integration of the value of the penalty image on the Fourier curved surface is minimized. Here, as the improvement of the above-described method, an image obtained by adding the size of the intensity gradient of the intended three-dimensional image with the minus sign to an absolute value of convolution between the intended three-dimensional image and a Laplacian-of-Gaussian (LoG) filter is set to the penalty image. The LoG filter performs secondary differentiation. Meanwhile, the intensity gradient can be obtained by a primary differential filter. Accordingly, the penalty image used therein is obtained by synthesizing a primary differential filter processing result and a secondary differential filter processing result of the intended three-dimensional image.

A procedure of synthesizing the penalty image will be described in detail with reference to FIG. 5. In order to one-dimensionally exemplify this synthesizing procedure, the variation of the intensity according to a straight line which passes through the nodule is shown by a graph G1. A mountain located at the central portion of the graph G1 corresponds to the nodule. A result obtained by performing the convolution between the LoG filter showing the shape as a graph G2 and the graph G1 and the absolute value thereof are shown by graphs G3 and G4, respectively. When the gradient of the intensity variation shown in the graph G1 is marked with the minus sign, a graph G5 can be obtained. By synthesizing the graph G4 and the graph G5, a graph G6 can be obtained. When comparing the graph G5 with the graph G6, the graph G6 has clear valleys at positions corresponding to the boundaries between the nodules and thus is more suitably used as the penalty value. The dotted line of FIG. 5 is a base line representing zero.

For example, as shown in FIG. 6, the ellipsoidal model is deformed such that the ellipsoidal model follows the valley of the penalty value of the penalty image.

Figure 7A:
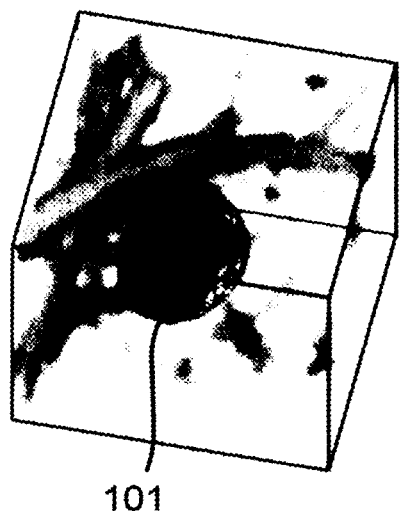
FIG. 7 is a view showing an ellipsoidal model after deformation is finished and a nodule candidate region specified by the ellipsoidal model.
Figure 7B:
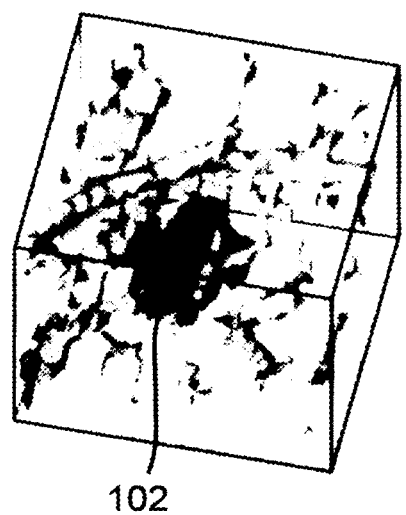

In a step Sa6, the nodule candidate region specifying unit 11 specifies the nodule candidate region in the original image to be processed before the distance transformation, based on the ellipsoidal model after the deformation is finished. That is, the nodule candidate region specifying unit 11 specifies a set of voxels which is located in the ellipsoidal model after the deformation is finished and belongs to the foreground portion of the lung region as the nodule candidate region. FIG. 7(a) is a view showing semi-transmissive display of a portion of the image to be processed, which corresponds to the nodule and the periphery thereof, with overlapping the ellipsoidal model 101 after the deformation is finished. A structure shown in FIG. 7(b) is the foreground portion of the lung region corresponding to the nodule and the periphery thereof shown in FIG. 3(a) and a nodule candidate region 102 specified above is shown in a relatively dark color.

For later reference, the ellipsoidal model after the deformation is finished, which is used in generating the nodule candidate region therein, is referred to as a generated ellipsoidal model of the nodule candidate region.

In a step Sa7, the expanded nodule candidate region specifying unit 12 determines an expanded nodule candidate region corresponding to the nodule candidate region. The expanded nodule candidate region corresponds to a structure including the nodule candidate region and a region connecting thereto.

The specification of the expanded nodule candidate region will be described in detail with reference to FIG. 8. The expanded nodule candidate region is three-dimensionally specified, but, in order to simplify the description, the expanded nodule candidate region is two-dimensionally specified therein.

Figure 8A:
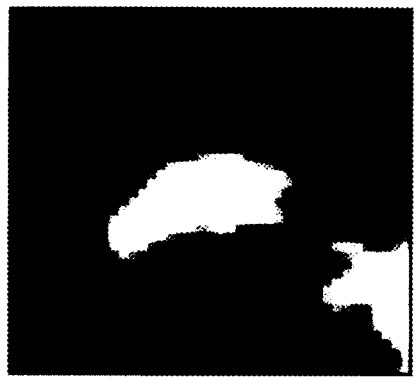
FIG. 8 is a view explaining specification of an expanded nodule candidate region.
Figure 8D:
Figure 8B:
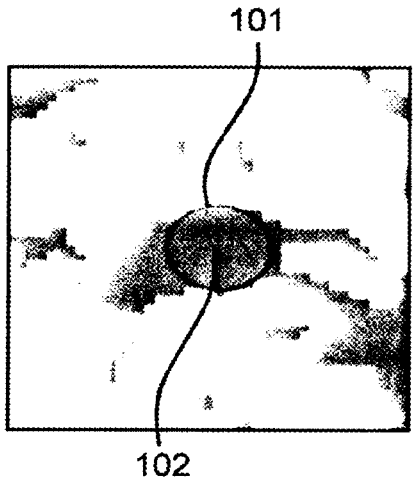

FIG. 8(a) shows a small region of the CT image. FIG. 8(b) shows the foreground portion of the lung region shown in gray color, the background portion shown in white color and one ellipse in the small region. Supposing that this ellipse is the generated ellipsoidal model 101 of the nodule candidate region, the description will be made. Accordingly, the gray region in a circle in FIG. 8(b) corresponds to the nodule candidate region 102.

Figure 8E:
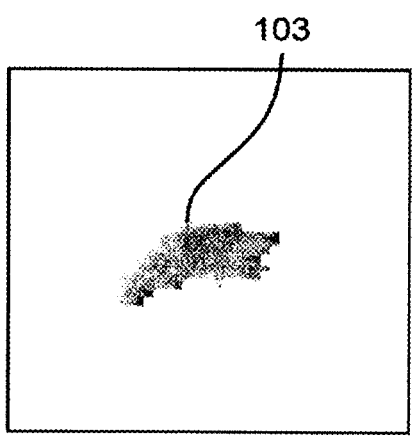
Figure 8C:
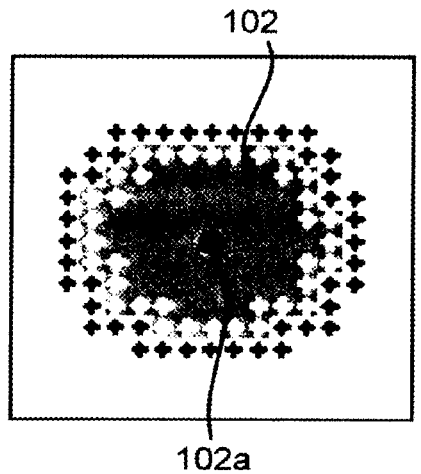
Figure 8F:
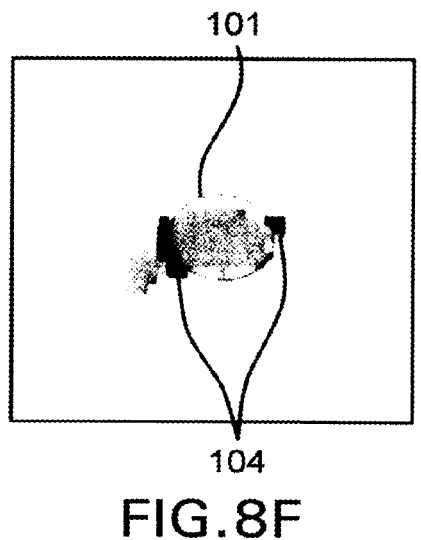

FIG. 8(c) is an enlarged view of the nodule candidate region 102. A black circle of FIG. 8(c) is a centroid 102a of the nodule candidate region 102. In FIG. 8(c), the voxel denoted by a white cross belongs to the nodule candidate region 102 and is adjacent to the voxel which does not belong to the nodule candidate region 102. A region including the voxels denoted by the white crosses is defined as an inner boundary of the nodule candidate region 102. The voxel denoted by a black cross does not belong to the nodule candidate region 102 and is adjacent to the voxel which belongs to the nodule candidate region 102. A region including the voxels denoted by the black crosses is defined as an outer boundary of the nodule candidate region 102. The average intensity of the voxels belonging to the inner boundary is defined as an inner boundary intensity of the nodule candidate region 102. Similarly, the average intensity of the voxels belonging to the outer boundary is defined as an outer boundary intensity of the nodule candidate region 102. The expanded nodule candidate region corresponding to the nodule candidate region 102 is obtained by a thresholding process using a weighted average (hereinafter, referred to as an average boundary intensity) of the inner boundary intensity and the outer boundary intensity as a threshold value. In the thresholding process, first, a three-dimensional array in which a voxel which has a intensity equal to or larger than the average boundary intensity and is located in the lung region is set to "1" and the other voxel is set to "0" is generated in the intended three-dimensional image. A region having a voxel shared with the nodule candidate region 102 in a connection component (a portion which has a value of "1", is a set of voxels connected with each other, and is shown in the gray color of FIG. 8(d)) in the three-dimensional array is defined as the expanded nodule candidate region 103 of the nodule candidate region 102, as shown in FIG. 8(e). The expanded nodule candidate region 103 is specified as a region including the nodule candidate region 102 and the peripheral region connecting to the nodule candidate region 102. A region including voxels adjacent to the voxel located in the generated ellipsoidal model 101 among the voxels located at the outside of the generated ellipsoidal model 101 (exemplified by the ellipse in FIG. 8(f)) of the nodule candidate region 102 and a region shared with the expanded nodule candidate region are defined as an expanded candidate region critical portion 104 (a portion shown in black color in FIG. 8(f)).

Figure 9A:
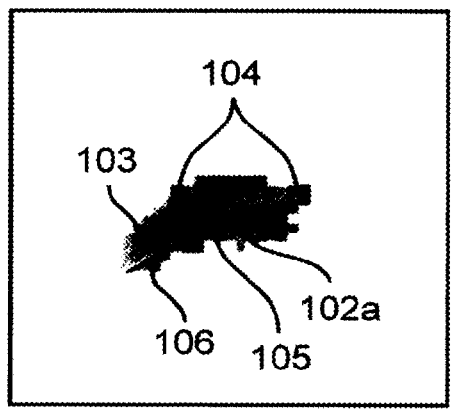
FIG. 9 is a view explaining a process of generating a search reference point.
Figure 9B:
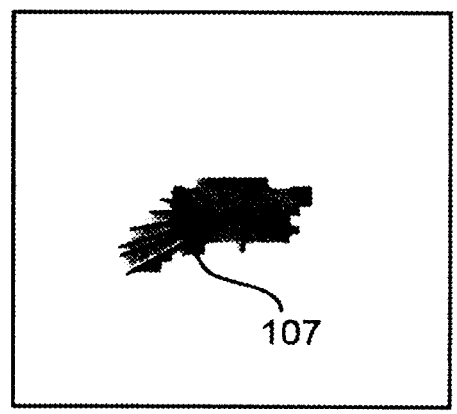

In a step Sa8, the judging unit 13 specifies a search reference point in the expanded nodule candidate region. The judging unit 13 generates the search reference point in one-to-one correspondence with the connection component of the expanded nodule candidate region critical portion 104. For example, with respect to a left connection component in FIG. 8(f), the judging unit 13 generates the search reference point as follows. As shown in FIG. 9(a), with respect to each voxel belonging to the connection component, the judging unit 13 expands a segment having the voxel as a start point in a vector 105 (hereinafter, referred to a centrifugal vector) direction from a centroid 102a of the nodule candidate region 102 to the voxel and stops the expansion when the end point thereof gets out of the expanded nodule candidate region 103. At this time, when the end point does not exist in the lung region, the voxel is excluded from a consideration. The segment determined above is referred to as a centrifugal direction segment 106. As shown in FIG. 9(b), the judging unit 13 selects a longest segment from a plurality of centrifugal direction segments 106 which are determined with respect to the plurality of voxels. The judging unit 13 determines the position of the voxel which applies the start point of the selected centrifugal direction segment 106 as the search reference point 107 corresponding to the connection component.

Figure 10:
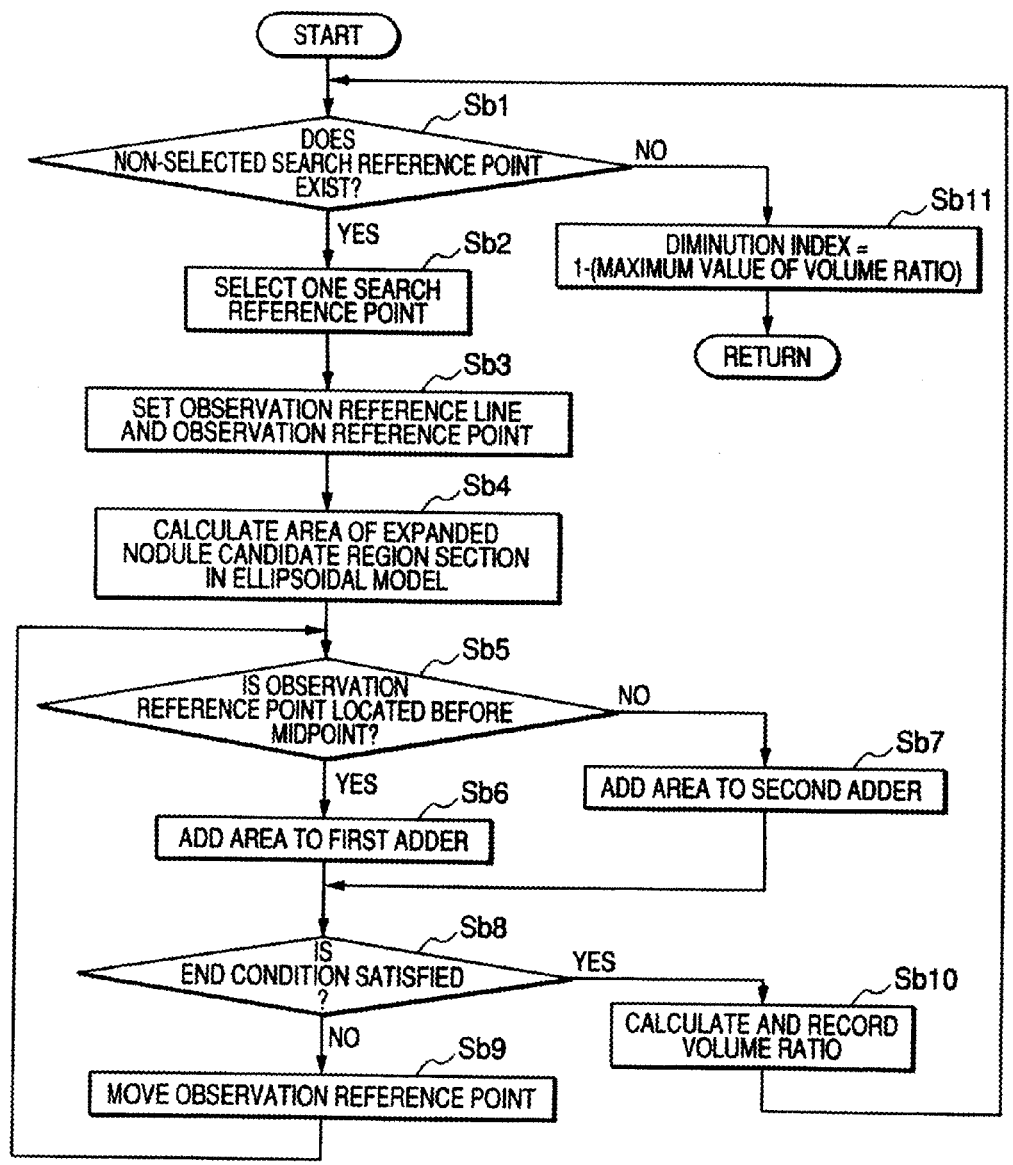
FIG. 10 is a flowchart showing a process of calculating diminution index by a judging unit shown in FIG. 1.

In a step Sa9, the judging unit 13 calculates a diminution index. FIG. 10 is a flowchart showing a process of calculating the diminution index by the judging unit 13. In this process, the expanded nodule candidate region is searched for and main operation status in the search are shown in FIGS. 11 to 14. FIGS. 11 and 12 show a case where the nodule candidate region corresponds to the nodule and FIGS. 13 and 14 show a case where the nodule candidate region corresponds to the lung blood vessel.

In a step Sb1, the judging unit 13 checks whether a non-selected search reference point 107 exists in a set of search reference points 107 which is obtained with respect to the expanded nodule candidate region 103.

If the non-selected search reference point 107 exists, the judging unit 13 progresses from the step Sb1 to a step Sb2. In a step Sb2, the judging unit 13 selects one non-selected search reference point 107 from the set of search reference points 107.

In a step Sb3, the judging unit 13 sets an observation reference line and an observation reference point based on the selected search reference point 107. As shown in FIG. 11(a), the judging unit 13 provides a directional segment having the centroid 102a of the nodule candidate region 102 as the start point such that the selected search reference point 107 becomes the midpoint thereof. This segment is defined as the observation reference line 108. The judging unit 13 sets the observation reference point on the centroid 102a. The observation reference point is not fixed and moves from the start point to the end point of the observation reference line, as described below.

In a step Sb4, the judging unit 13 defines a plane which is perpendicular to the observation reference line 108 and passes through the observation reference point as an observation plane 109. As shown in FIG. 11b, the judging unit 13 sets an ellipsoidal model which is initialized by an ellipse given by an intersection between the generated ellipsoidal model of nodule candidate region and the observation plane in the observation plane. Next, the judging unit 13 deforms the ellipsoidal model such that line integral of the value of the penalty image used in the step Sa3 on the ellipsoidal model is minimized. The judging unit 13 calculates the area of a portion located at the inside of the ellipsoidal model after the deformation is finished (hereinafter, referred to as an expanded nodule candidate region section in the ellipsoidal model), in the section of the expanded nodule candidate region in the observation plane 109. FIG. 11(b) shows the ellipsoidal model 110 after the deformation is finished. FIG. 11(c) shows the expanded nodule candidate region section 111 in the ellipsoidal model, which is included in FIG. 11(b).

In a step Sb5, the judging unit 13 judges whether a current observation reference point is located before the midpoint of the observation reference line 108 (before the search reference point 107).

When the current observation reference point is located before the midpoint of the observation reference line 108, the judging unit 13 progresses from the step Sb5 to a step Sb6, and, otherwise, progresses from the step Sb5 to a step Sb7. In a step Sb6, the judging unit 13 adds the area of the expanded nodule candidate region section in the ellipsoidal model calculated above to a first adder. In a step Sb7, the judging unit 13 adds the area of the expanded nodule candidate region section in the ellipsoidal model calculated above to a second adder. The first adder and the second adder are included in the judging unit 13. The first adder and the second adder are initialized to zero when the process shown in FIG. 10 begins.

In a step Sb8, the judging unit 13 checks whether an end condition is satisfied or not. Here, the number of the end conditions is four and the end points are as follows:

(First End Condition)
The observation reference point reaches the end point of the observation reference line.

(Second End Condition)
The expanded nodule candidate region section in the ellipsoidal model disappeared.

Figure 15A:
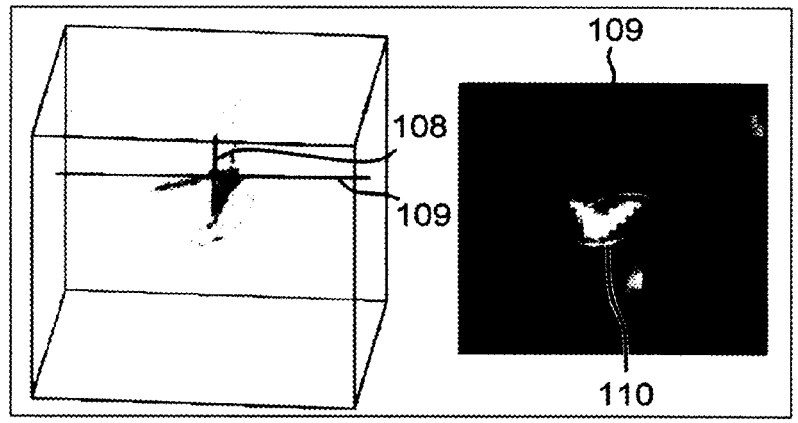
FIG. 15 is a view explaining a third end condition.
Figure 15B:
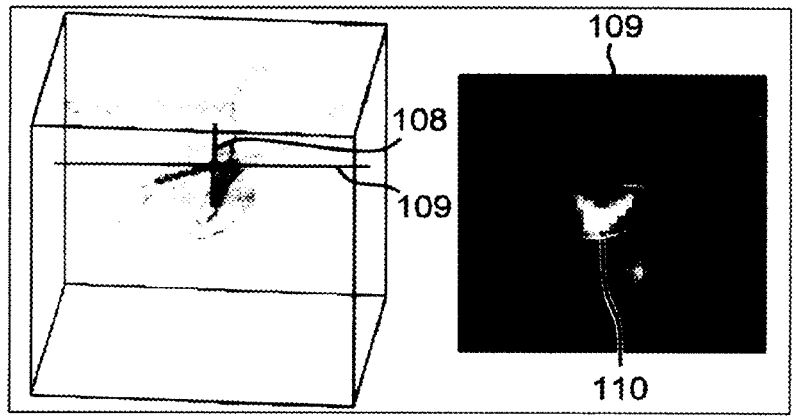
Figure 15C:
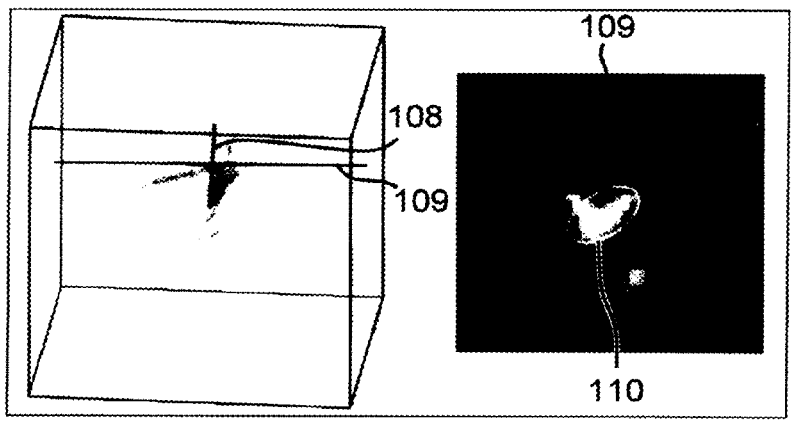

(Third End Condition)
The description will be made with reference to FIG. 15. FIG. 15 shows the transition of the ellipsoidal model after the deformation is finished when the observation reference point moves from FIG. 15(a) to FIG. 15(b) and from FIG. 15(b) to FIG. 15(c) by two steps in the vicinity of the edge of the nodule attached to a blood vessel. The size of the ellipsoidal model 110 suddenly varies between FIG. 15(b) and FIG. 15(c). This is because the section of the nodule is not observed in the range of the ellipsoidal model 110 in the edge of the nodule attached to the blood vessel, that is, only the section of the blood vessel is observed. Accordingly, the next search is meaningless and thus the generation of the above-described state is set to the end condition. The satisfaction of the end condition can be judged by the following process. The relative average displacement of the ellipsoidal model obtained by dividing the average displacement of the ellipsoidal model (obtained as an average distance between points corresponding to two point rows in consideration of a point row according to the circumference of the ellipsoidal model before the deformation is finished and a point row according to the circumference of the ellipsoidal model after the deformation is finished) at the position of each observation reference point by an average effective radius of the ellipsoidal model (an average value of an effective radius of the ellipsoidal model before the deformation is finished and an effective radius of the ellipsoidal model after the deformation is finished) is calculated. When the relative average displacement of the ellipsoidal model is larger than a predetermined upper limit value, it is considered that this end condition is satisfied.

Figure 16A:
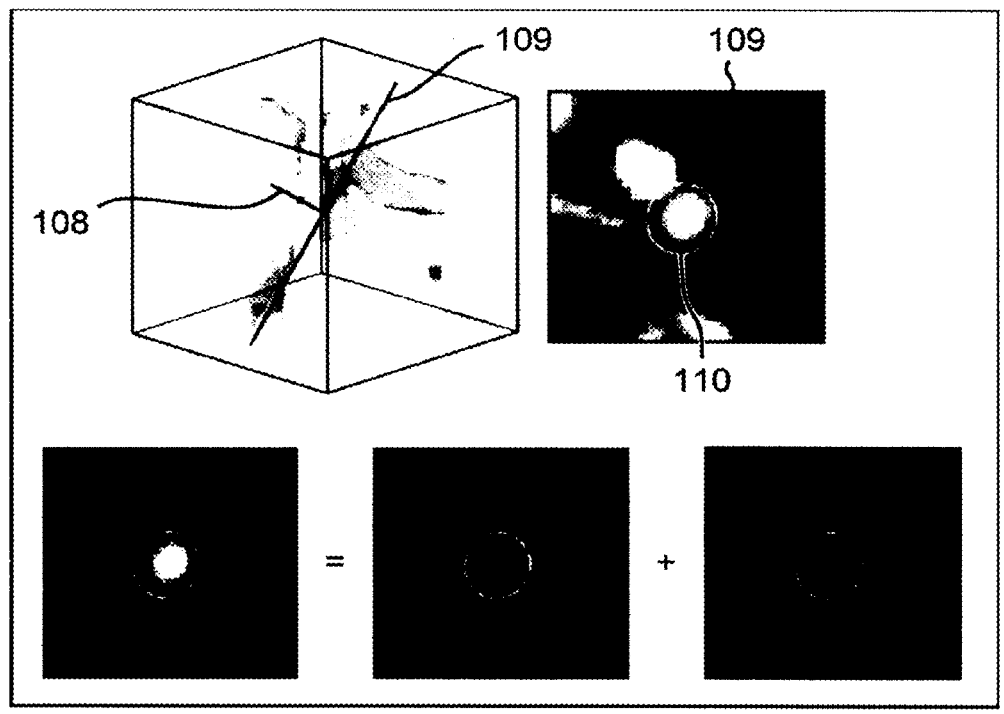
FIG. 16 is a view explaining a fourth end condition.
Figure 16B:
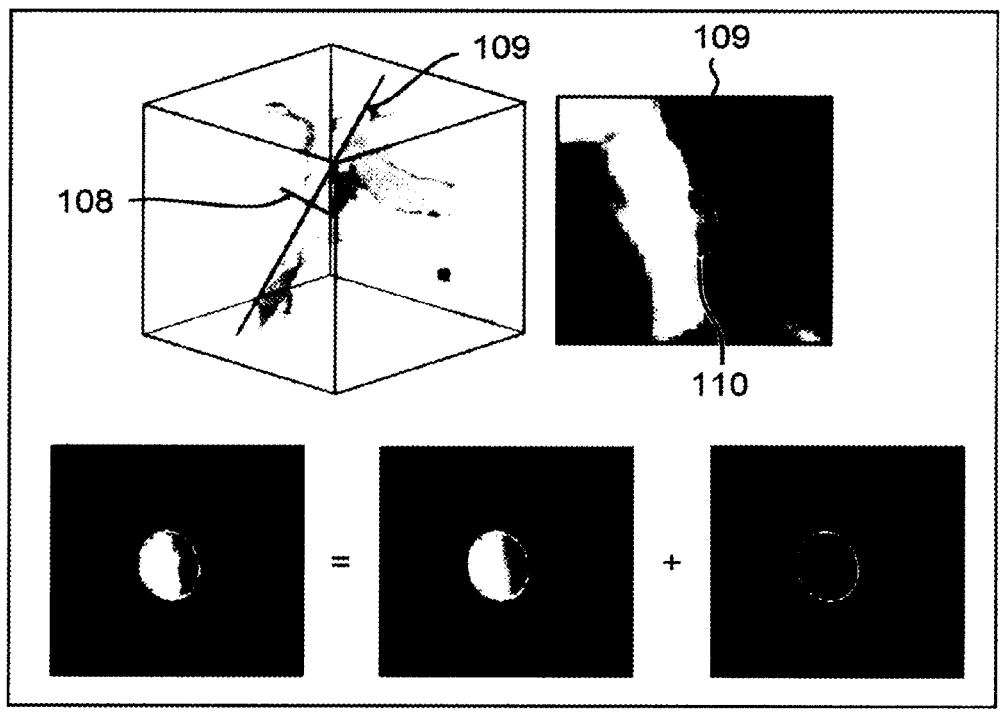

(Fourth End Condition)
The description will be made with reference to FIG. 16. FIG. 16 is a view showing another nodule attached to the blood vessel. FIG. 16(a) shows a case where the observation reference point is in the vicinity of the start point of the observation reference line and FIG. 16(b) shows a case where the observation reference point is in the vicinity of the midpoint of the observation reference line. As shown in the lower portions of FIG. 16(a) and FIG. 16(b), a portion of the ellipsoidal model in the image to be processed (hereinafter, referred to as an image in the ellipsoidal model), which corresponds to the observation plane 109 can be decompressed into a component in which the intensity thereof linearly varies according to a coordinate in the plane (hereinafter, referred to as an linear component of the image in the ellipsoidal model) and the other component (hereinafter, referred to as a nonlinear component of the image in the ellipsoidal model). When the ellipsoidal model substantially matches with the horizontal section of the blood vessel or the section of the nodule as shown in FIG. 16(a), the intensity variation of the image in the ellipsoidal model is mainly described by the intensity variation of the non-linear component of the image in the ellipsoidal model. However, as shown in FIG. 16(b), when the ellipsoidal model is deviated from the central portion of the blood vessel and overlaps the vertical section of the blood vessel, most of the intensity variation of the image in the ellipsoidal model is described by the intensity variation of the linear component of the image in the ellipsoidal model. In general, the case similar to FIG. 16(b) may occur in a transition portion between the nodule attached to the blood vessel and the blood vessel. When this state occurs, the next search is meaningless and thus the generation of the above-described state is set to the end condition. The satisfaction of the end condition can be judged by the following process. A non-linear component contribution ratio of the image in the ellipsoidal model obtained by dividing a standard deviation of the intensity of the non-linear component of the image in the ellipsoidal model at the position of each observation reference point by a standard deviation of the intensity of the image in the ellipsoidal model is calculated. When the non-linear component contribution ratio of the image in the ellipsoidal model is smaller than a predetermined lower limit value, it is considered that this end condition is satisfied.

When all the above-described end conditions are not satisfied, the judging unit 13 progresses from the step Sb8 to a step Sb9. In the step Sb9, the judging unit 13 moves the observation reference point on the observation reference line 108 in a regular narrow interval. Accordingly, the observation plane moves according to the observation reference point. The judging unit 13 repeats the steps after the step Sb4. Accordingly, the judging unit 13 repeats the process of deforming the ellipsoidal model and calculating the area of the expanded nodule candidate region section in the ellipsoidal model until the end condition is satisfied while moving the observation reference point in the regular interval.

When the end condition is satisfied, the judging unit 13 progresses from the step Sb8 to a step Sb10. In the step Sb10, the judging unit 13 calculates a quotient obtained by dividing the value of the second adder by the value of the first adder. This quotient represents a volume ratio of the proximal portion to the distal portion of the expanded nodule candidate region with respect to the search reference point selected currently. The judging unit 13 records the calculated volume ratio. Thereafter, the judging unit 13 repeats the steps after the step Sb1. Accordingly, the judging unit 13 calculates and records the respective volume ratios of all the search reference points 107 which are obtained with respect to the expanded nodule candidate region 103.

When the calculation of the respective volume ratios of all the search reference points 107 obtained with respect to the expanded nodule candidate region 103 is finished, the non-selected search reference point cannot be found in the step Sb1. Accordingly, in this case, the judging unit 13 progresses from the step Sb1 to a step Sb11. When any search reference point 107 is not obtained with respect to the expanded nodule candidate region 103, the judging unit 13 progresses from the step Sb1 to the step Sb11 without performing the steps after the step Sb2 just after the process of FIG. 10 begins. In the step Sb11, the judging unit 13 sets a value obtained by subtracting "1" from a quotient having a maximum value among the quotients of all the search reference points as the diminution index of the nodule candidate region 102. When any search reference point 107 is not obtained, a quotient having the maximum value among the recorded quotients is set to "0".

The diminution index calculated above is a feature quantity for summarizing a relationship between the nodule candidate region 102 and a structure connecting thereto. More specifically, the diminution index is the feature quantity representing a relative volume decrease degree for the distal portion of the expanded nodule candidate region to the proximal portion of the expanded nodule candidate region, which is obtained by centrifugally searching for the expanded nodule candidate region 103 from the centroid 102a of the nodule candidate region 102 to any distance.

When the calculation of the diminution index is finished, the judging unit 13 progresses from the step Sa9 to a step Sa10 in FIG. 2. In the step Sa10, the judging unit 13 judges whether the nodule candidate region 102 is the nodule or not. When the nodule candidate region 102 is a portion of the lung blood vessel, both the proximal portion and the distal portion of the expanded nodule candidate region 103 corresponding to the nodule candidate region 102 are the portion of the lung blood vessel and thus the diminution index is very small. That is, the diminution index is close to zero. In contrast, when the nodule candidate region 102 corresponds to the nodule isolated from the blood vessel, the volume of the distal portion of the expanded nodule candidate region 103 is smaller than that of the distal portion of the expanded nodule candidate region 103 and thus the diminution index is close to 1 which is the maximum value thereof. The judging unit 13 performs the judgment using the property which can be seen from the diminution index and a relatively simple feature quantity such as the effective diameter or the intensity contrast of the nodule candidate region 102.

According to the first embodiment, it is possible to distinguish a tissue such as a nodule or a blood vessel with high accuracy in order to refer to a ratio of the feature quantity of a nodule candidate region to a peripheral region connecting to the nodule candidate region with respect to each of nodule candidate regions which may be nodules in a three-dimensional image acquired by the multi-slice CT 2. Accordingly, it is possible to provide a CAD system having high detection sensitivity of the nodule and low false positive.

According to the first embodiment, since the nodule candidate region is automatically specified from the three-dimensional image, it is possible to automatically detect the nodule from the three-dimensional image. Accordingly, it is possible to reduce the burden of a doctor and to prevent the nodule from being overlooked.

According to the first embodiment, the above-described diminution index is the volume ratio of the proximal portion to the distal portion of the expanded nodule candidate region. That is, the respective feature quantities of the nodule candidate region and the peripheral region are obtained as the volume of the portion in the vicinity of the boundary between the both regions. Accordingly, the process such as the calculation of the feature quantities of all the nodule candidate regions, the specification of the shapes of all the peripheral regions or the calculation of the feature quantities of all the peripheral regions need not be performed and the first embodiment is efficient.

Second Embodiment

Figure 17:
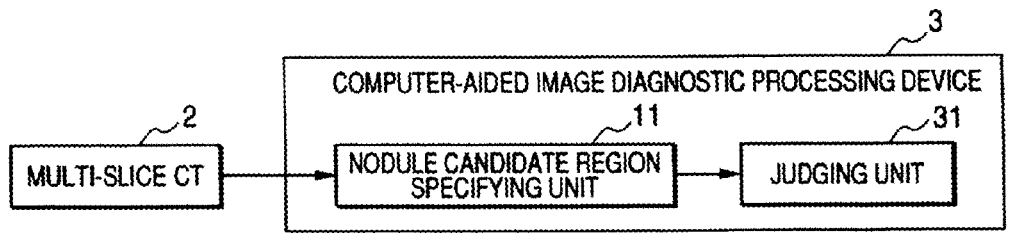
FIG. 17 is a view showing the configuration of a computer-aided image diagnostic processing device according to a second embodiment using an image diagnostic processing device according to the present invention.

FIG. 17 is a view showing the configuration of a computer-aided image diagnostic processing device 3 using the image diagnostic processing device according to the present invention. In FIG. 17, the same portions as FIG. 1 are denoted by the same reference numerals and their detailed description will be omitted.

The computer-aided image diagnostic processing device 3 shown in FIG. 17 processes three-dimensional image data acquired by a multi-slice CT 2. As shown in FIG. 17, the computer-aided image diagnostic processing device 3 includes a nodule candidate region specifying unit 11 and a judging unit 31.

The computer-aided image diagnostic processing device 3 can, for example, use a general-purpose computer device as basic hardware, similar to the computer-aided image diagnostic processing device 1 according to the first embodiment.

The judging unit 31 judges whether a nodule candidate region is a nodule or not, based on a foreground occupancy ratio of an ellipsoidal model included in the nodule candidate region and a foreground occupancy region of the ellipsoidal model including the nodule candidate region.

Next, the operation of the computer-aided image diagnostic processing device 3 configured above will be described.

Figure 18:
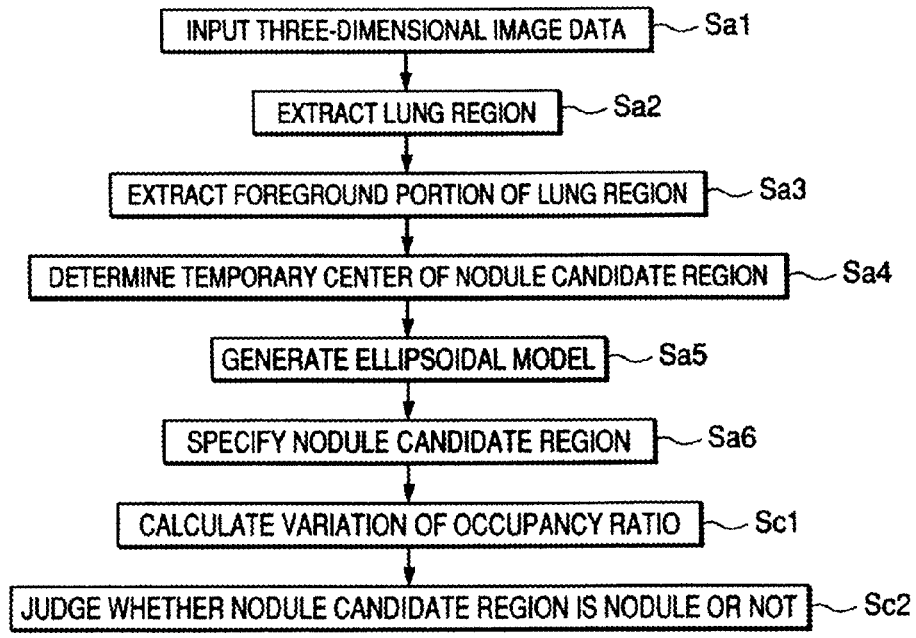
FIG. 18 is a flowchart schematically showing a process of detecting a nodule in the computer-aided image diagnostic processing device shown in FIG. 17.

FIG. 18 is a flowchart schematically showing a process of detecting the nodule in the computer-aided image diagnostic processing device 3. In FIG. 18, the same steps as FIG. 2 are denoted by the same reference numerals and their detailed description will be omitted.

As shown in FIG. 18, first, steps Sa1 to Sa6 are performed by the nodule candidate region specifying unit 11 using the same method as the first embodiment. Thereafter, a step Sc1 and a step Sc2 are performed by the judging unit 31.

In the step Sc1, the judging unit 31 calculates the variation of the occupancy ratio. Hereinafter, the calculation of the variation of the occupancy ratio will be described with reference to FIG. 19.

Figure 19:
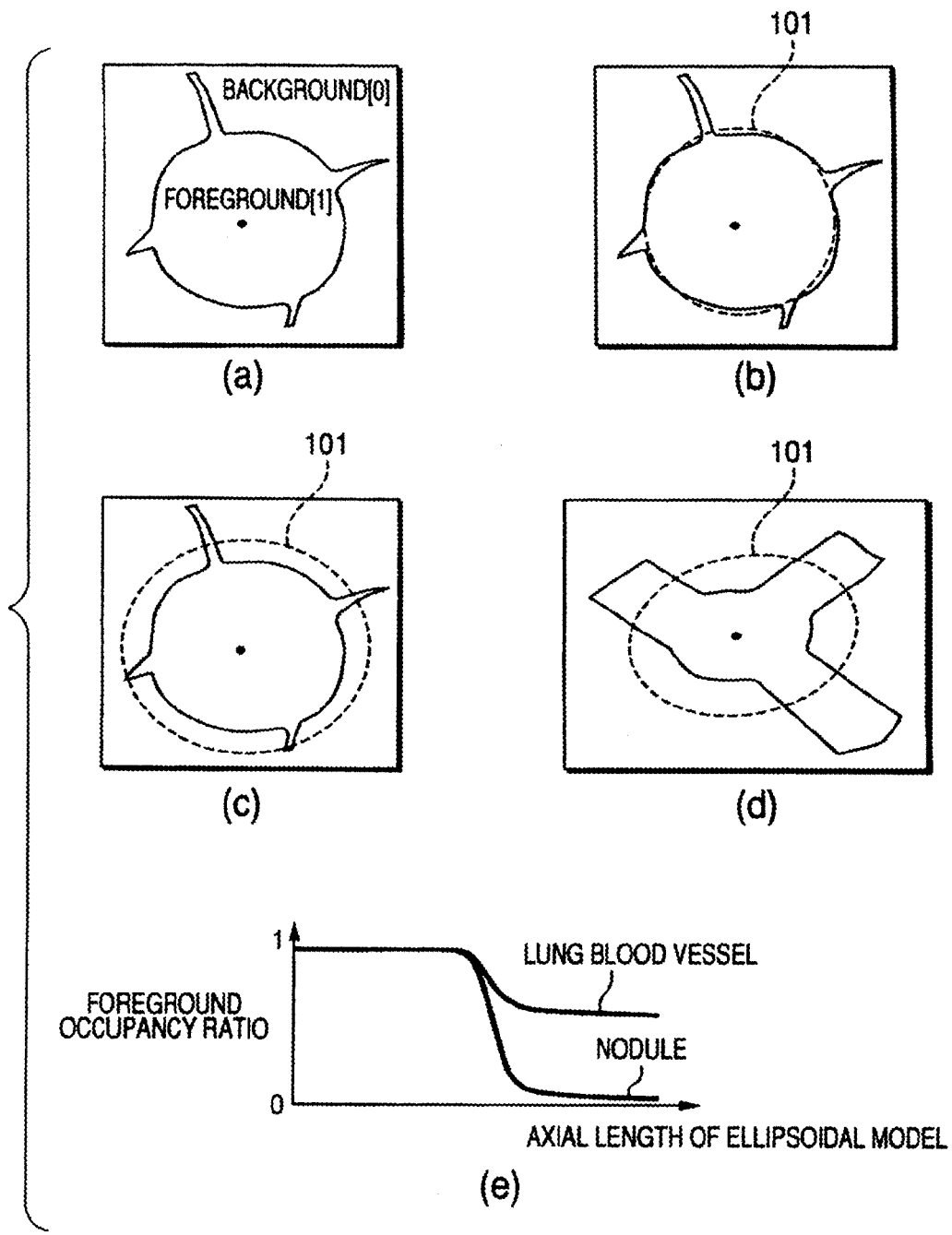
FIG. 19 is a view explaining the variation of an occupancy ratio.

First, as shown in FIG. 19(*a*), the value of a voxel belonging to a foreground portion is set to "1" and the value of a voxel belonging to a background portion is set to "0". The judging unit 31 calculates a ratio of the voxels belonging to the foreground portion to the voxels belonging to the background portion (hereinafter, referred to as a foreground occupancy ratio) in the voxels included in the generated ellipsoidal model generated by the nodule candidate region specifying unit 11. Thereafter, the judging unit 31 calculates the variation of the foreground occupancy ratio while maintaining the axis rotation directions and a ratio of the axial lengths of three major axes and sequentially enlarging the generated ellipsoidal model 101. This variation is the variation of the occupancy ratio.

As shown in FIG. 16(*b*), since the generated ellipsoidal model 101 generated by the nodule candidate region specifying unit 11 follows the vicinity of the edge of the nodule candidate region, the region in the generated ellipsoidal model 101 substantially matches with the nodule candidate region. In this state, the foreground occupancy ratio substantially becomes "1". When the generated ellipsoidal model 101 enlarges, the foreground portion is included in the generated ellipsoidal model 101 and thus the foreground occupancy ratio decreases. In the case of the nodule, as shown in FIG. 19(*c*), since the peripheral region of the nodule candidate region is small, most of the enlarged region of the generated ellipsoidal model 101 becomes the background region. In contrast, in the case of the lung blood vessel, as shown in FIG. 19(*d*), since the peripheral region of the nodule candidate region is large, the large foreground region is included in the enlarged region of the generated ellipsoidal model 101. Accordingly, as shown in FIG. 19(*e*), when the nodule candidate region is the nodule, the variation of the occupancy ratio is larger than that of the case of the lung blood vessel.

In the step Sc2, the judging unit 31 judges whether the nodule candidate region is the nodule or not, using the above-described property and a relative simple feature quantity such as the effective diameter or the intensity contrast of the nodule candidate region 102.

The process of sequentially increasing only the axial length from the central portion of the ellipsoidal model may begin from an ellipsoidal model slightly smaller than the generated ellipsoidal model 101 generated by the nodule candidate region specifying unit 11.

According to the second embodiment, since the judgment is performed in consideration of the feature of the peripheral region connecting to the nodule candidate region, it is possible to distinguish a tissue such as a nodule and a blood vessel with very high accuracy.

Third Embodiment

The first or second embodiment is efficient for the detection of solid nodules. However, with respect to a ground glass opacity (GGO) type nodule, it is difficult to apply an ellipsoidal model to the GGO type nodules.

In the GGO type nodule, the existing lung blood vessel or a component having a higher intensity is observed. That is, an object having relatively high contrast, which is surrounded by an object having relatively low contrast such as the GGO, may exist. Accordingly, in the first or second embodiment, the following problems may be caused.

(1) When the lung region is divided into the foreground portion and the background portion by an adaptive thresholding process, only a portion of the nodule may enter the foreground portion in the GGO type nodule. In such a case, the value for transforming the distance of the foreground portion is set to the initial radius of the ellipsoidal model, the actual radius of the nodule is significantly small.

(2) Since a penalty image used in deforming the ellipsoidal model is calculated based on the intensity gradient, there is a high possibility that the surface of the ellipsoidal model is attracted toward the boundary portion of the blood vessel or the high intensity component surrounded by the GGO.

(3) When the expanded nodule candidate region necessary for the calculation of the diminution index is obtained by the thresholding process, the threshold value is determined using the result of the adaptive thresholding process and the deformation of the ellipsoidal model. Accordingly, when the adaptive thresholding process of the GGO type nodule or the deformation of the ellipsoidal model is inadequately finished, the expanded nodule candidate region becomes also inadequate.

Among them, a most basic problem is the penalty image. Conventional means for deforming a variable shape model according to the intensity gradient without being limited to the ellipsoidal model is used, but is inadequate in the GGO type nodule.

Accordingly, the third embodiment suitable for the detection of the GGO type nodule based on the above-described problems will be described.

In the third embodiment, a method of determining the adequate threshold intensity of the original image and deforming the ellipsoidal model using the penalty image based on the threshold intensity is used. The expanded nodule candidate region is previously obtained using the same threshold intensity. The initial radius of the ellipsoidal model is also determined using the original image.

The third embodiment is configured by three improvements including the determination of the initial radius of the ellipsoidal model, the determination of the threshold intensity and the preparation of the penalty image. As described later in detail, the penalty image of the given original image is prepared by a simple procedure controlled by the initial radius of the ellipsoidal model, the threshold intensity and a previously set parameter. The process of determining the initial radius of the ellipsoidal model is simple.

Figure 20:
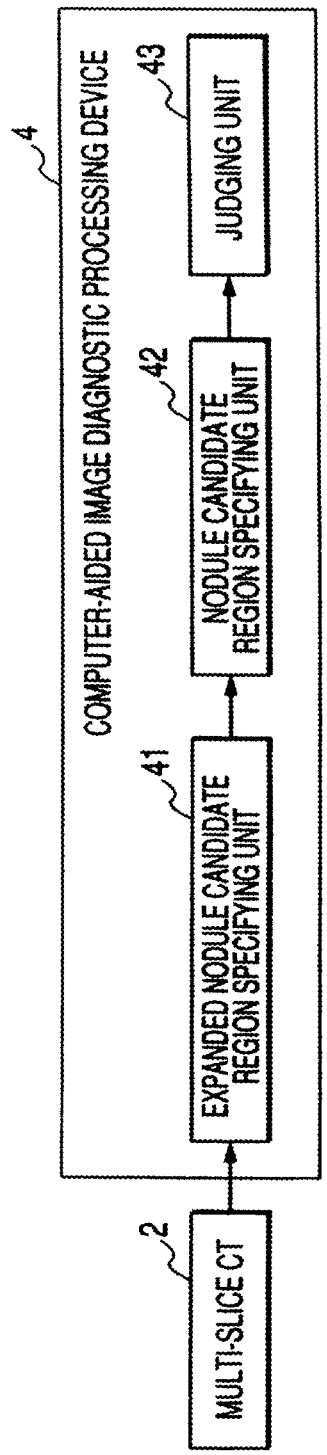
FIG. 20 is a view showing the configuration of a computer-aided image diagnostic processing device according to a third embodiment using an image diagnostic processing device according to the present invention.

FIG. 20 is a view showing the configuration of a computer-aided image diagnostic processing device 4 using the image diagnostic processing device according to the present invention.

The computer-aided image diagnostic processing device 4 shown in FIG. 20 processes three-dimensional image data acquired by a multi-slice CT 2. As shown in FIG. 20, the computer-aided image diagnostic processing device 4 includes an expanded nodule candidate region specifying unit 41, a nodule candidate region specifying unit 42 and a judging unit 43.

The computer-aided image diagnostic processing device 4 can, for example, use a general-purpose computer device as basic hardware, similar to the computer-aided image diagnostic processing device 1 according to the first embodiment.

The expanded nodule candidate region specifying unit 41 specifies an expanded nodule candidate region including a nodule candidate region and a peripheral region connecting thereto in an image to be processed, which is represented by three-dimensional image data. The nodule candidate region specifying unit 42 specifies a nodule candidate region which may be a nodule in the image to be processed. The judging unit 43 judges whether a nodule candidate region is a nodule or not, based on the respective feature quantities of the nodule candidate region and the peripheral region.

Next, the operation of the computer-aided image diagnostic processing device 4 configured above will be described.

Figure 21:
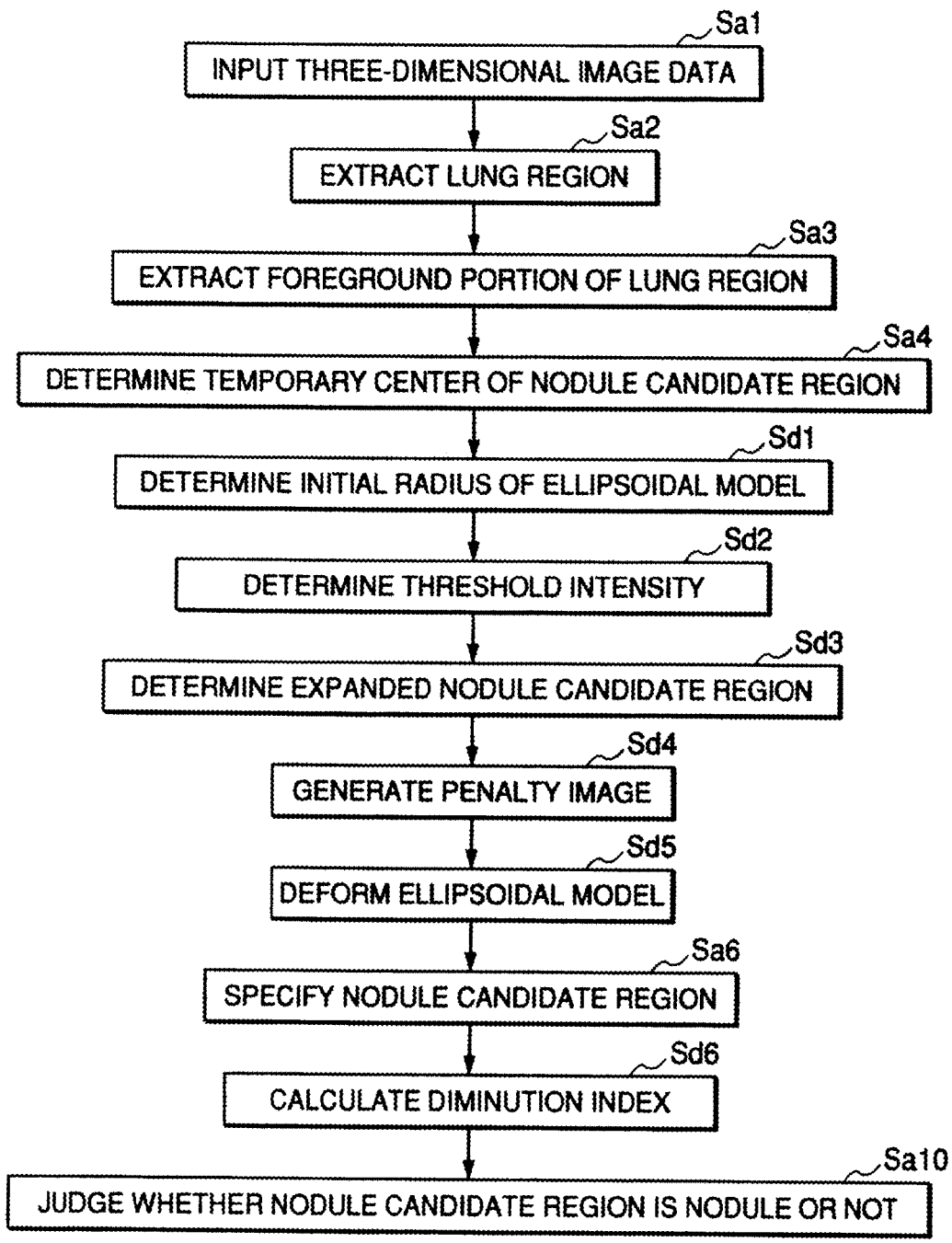
FIG. 21 is a flowchart schematically showing a process of detecting a nodule in the computer-aided image diagnostic processing device shown in FIG. 20.

FIG. 21 is a flowchart schematically showing a process of detecting the nodule by the computer-aided image diagnostic processing device 4. In FIG. 21, the same steps as FIG. 2 are denoted by the same reference numerals and their detailed description will be omitted.

As shown in FIG. 21, first, steps Sa1 to Sa4 are performed by the same method as the first embodiment. In the third embodiment, the steps Sa1 to Sa4 denote a process performed by the expanded nodule candidate region specifying unit 41. Among the other steps shown in the flowchart of FIG. 21, the steps Sd1 to Sd3 denote the process performed by the expanded nodule candidate region specifying unit 41. A step Sd4, a step Sd5 and a step Sa6 denote a process performed by the nodule candidate region specifying unit 42. A step Sd6 and a step Sa10 denote a process performed by the judging unit 43.

In the step Sd1, the expanded nodule candidate region specifying unit 41 determines the initial radius of the ellipsoidal model. More specifically, first, the expanded nodule candidate region specifying unit 41 sets a cubic region of which one side is formed of an array of 2n+1 voxels centered on the temporary center of the nodule candidate in the lung region of interest. When the temporary center of the nodule candidate does not match with the center of the voxel, the expanded nodule candidate region specifying unit 41 sets the center of the voxel closest to the temporary center of the nodule candidate to the center of the region of interest. Here, n is a positive integer and the expanded nodule candidate region specifying unit 41 sets n to 1. The expanded nodule candidate region specifying unit 41 calculates the entropy of a intensity histogram in the region of interest. Subsequently, the expanded nodule candidate region specifying unit 41 repeats a cycle in which n increases by one to update the region of interest and the entropy of the intensity histogram in the region of interest after update is calculated, until the maximum value of the entropy value is detected. The calculation of the entropy can be performed using the existing method. The existing method is disclosed in "Kadir T, Brady M. Saliency, scale, and image description. International Journal of Computer Vision 2001; 45: 83-105".

The expanded nodule candidate region specifying unit 41 sets n which applies the maximum value of the entropy to N and sets N times of the voxel width to the initial radius of the ellipsoidal model. That is, as the distribution of the voxel value of the voxel in the region of interest is uniform, the entropy calculated above decreases. Accordingly, when the outer edge of the region of interest exists in the vicinity of the boundary between the structure such as the nodule shown in the CT image and the periphery thereof, the entropy increases. That is, there is a high possibility that the length of one side of the region of interest when the entropy becomes maximum is close to the diameter of the structure such as the nodule. Accordingly, the expanded nodule candidate region specifying unit 41 sets a distance between the center of the voxel located at the center of the region of interest and the center of the voxel located at the end when the entropy becomes maximum, that is, the radius of a sphere inscribed in the region of interest, to the initial radius.

Figure 22:
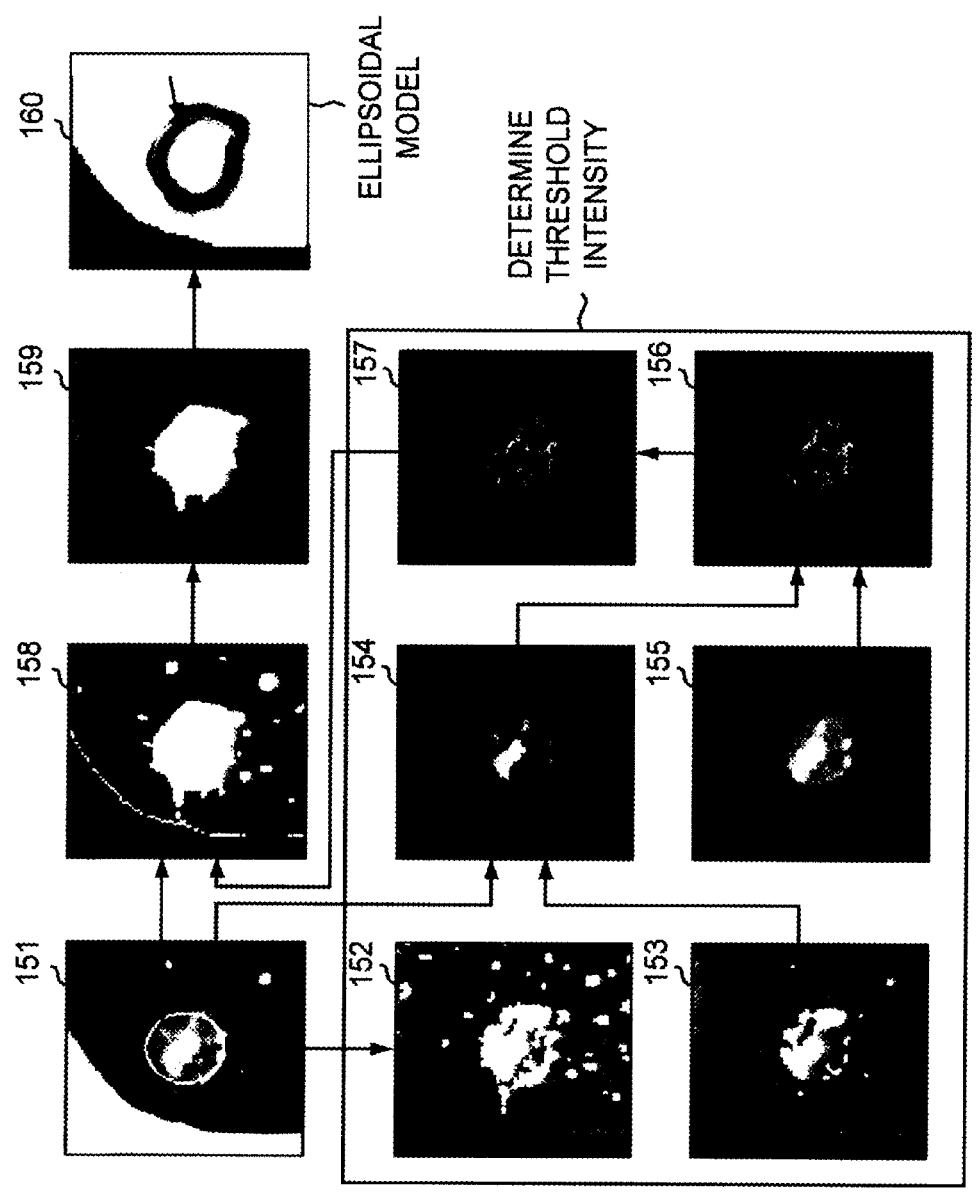
FIG. 22 is a view showing an image used until an ellipsoidal model is determined after an initial radius of the ellipsoidal model is determined.

FIG. 22 is a view showing an image used until the ellipsoidal model is determined after the initial radius of the ellipsoidal model is determined. FIG. 22 shows a two-dimensional image, but actually uses a three-dimensional image. An image 151 shows a CT image included in the GGO type nodule with overlapping a circle having the initial radius determined with respect to the nodule.

In a step Sd2, the expanded nodule candidate region specifying unit 41 determines a threshold intensity. Hereinafter, the determination of the threshold intensity will be described with reference to FIG. 22.

The expanded nodule candidate region specifying unit 41 sets a cubic region of which the length of one side is several times the initial radius obtained above in the lung region centered on the temporary center of the nodule candidate as region of interest. The multiple may be optional, but is preferably set such that the region of interest sufficiently includes the nodule and the peripheral region thereof. In general, it may be considered that the multiple is three times. The next process is performed in the region of interest.

In the third embodiment, the existing method using the intensity gradient applies to the determination of the threshold value. This method is disclosed in "Kittler J, Illingworth J, Foglein J. Threshold selection based on a simple image statistics. Computer Vision Graphic and Image Processing 1985; 30: 125-147". Hereinafter, the determination of the threshold is referred to as the Kittler method. This Kittler method is based on the following consideration.

The object of the determination of the threshold value is to rightly divide a target region into an object region and a background region by the thresholding process under the assumption that the target region of the image is configured by the object and the background. Since it is considered that the intensity gradient having a significant size exists in the boundary between the object and the background, when the weighted average of the intensity of the voxels in the region of interest is calculated using the size of the intensity gradient in each voxel (in the Kittler method, the intensity gradients of x and y directions are obtained and a larger intensity gradient is used) as a weight, the weighted average may be considered to an approximate value of the average intensity of the voxels located at the boundary between the object and the background. Accordingly, the weighted average is determined to the threshold value.

In a circumference that a plurality of voxels representing the intensity gradient having the significant size exists in a position separated from the boundary between the object and the background, that is, the irregularity of the object intensity is high or noise is high, the Kittler method does not function well. Accordingly, the expanded nodule candidate region specifying unit 41 can apply the Kittler method to the following process when determining the threshold value.

It is assumed that the GGO having a high intensity component or a blood vessel therein exists in the central portion of the region of interest and a target region which does not include the high intensity component or the blood vessel in the GGO can be set. If so, since the object and the background in the target region substantially corresponds to the GGO and the substantial lung, when the Kittler method applies to the target region, it is considered that an adequate threshold intensity is obtained.

Accordingly, acquisition of the target region (hereinafter, referred to as a threshold determining target region) is considered. Next, the detailed procedure of obtaining the threshold determining target region will be described.

In an image 152, a voxel belonging to the foreground portion is shown in white color and a voxel belonging to the background portion is shown in gray color in the region of interest. In the image 152, a region shown in black color is a region other than the region of interest.

An image 153 is obtained by extracting a reduction foreground portion from the image 152. A white portion of the image 152 represents the reduction foreground portion. The reduction foreground portion is a portion except voxels adjacent to the voxels belonging to the background portion by 6-connectivity among the voxels belonging to the foreground portion. More specifically, the expanded nodule candidate region specifying unit 41 checks whether, with respect to each of the voxels belonging to the foreground portion, all six voxels adjacent to the voxel in x, y and z directions belong to the foreground portions in the image 152. The expanded nodule candidate region specifying unit 41 sets only the voxels which satisfy the above-described condition to the reduction foreground portion and sets the other voxels to the background portion, thereby obtaining the image shown in the image 153. Accordingly, the reduction foreground portion becomes a set of voxels having a relatively large voxel values.

Next, the expanded nodule candidate region specifying unit 41 extracts the voxels which are in a spherical model having the initial radius determined in the step Sd1 and belong to the reduction foreground portion from the CT image shown in the image 151 to obtain an image 154 and sets the image 154 to an initial region to be expanded.

The expanded nodule candidate region specifying unit 41 sets the initial region to a current region. The expanded nodule candidate region specifying unit 41 checks whether the intensity of each of the voxels which are adjacent to the voxels belonging to the inner boundary of the current region (hereinafter, referred to inner boundary voxels) and belong to an outer boundary of the current region (hereinafter, referred to as outer boundary voxels) is smaller than a defined intensity or not. The expanded nodule candidate region specifying unit 41 sets a value obtained by adding a parameter α to the intensity of the inner boundary voxel adjacent to the outer boundary voxel to the defined intensity.

When the outer boundary voxel which satisfies the above-described condition exists, the voxel is added to the current region to expand the current region. When the current region is expanded, the process is repeated with respect to each of the outer boundary voxels of a new boundary. This cycle is repeated until the voxel to be newly added to the current region is not found. The parameter α is set in a range from 0 to noise standard deviation such that the region is expanded in a direction for gradually decreasing the intensity. Accordingly, the object having the high contrast is not included in expanded result of the region except the vicinity of the initial region.

An image 155 can be obtained as the result of the expanding process. The expanded nodule candidate region specifying unit 41 sets a line region shown in an image 156 except the initial region in the result of the expanding process to a potential threshold determining target region.

When the GGO having the high intensity component or the blood vessel therein exists in the center of the region of interest, it is considered that the high intensity component or the blood vessel enters the foreground portion. Since the initial region is the foreground portion in the ellipsoidal model of the initial state, most of the high intensity component or the blood vessel is excluded from the potential threshold determining target region.

In the other case, it is considered that any structure located at the center of the region of interest substantially corresponds to the foreground portion. The potential threshold determining target region includes a portion corresponding to the inner boundary of the foreground portion in the ellipsoidal model of the initial state. That is, a portion which follows the edge of the structure is included in the potential threshold determining target region and the value determined as the threshold value is close to the average intensity according to the edge of the structure when the Kittler method applies to the potential threshold determining target region.

It is considered that, when the intensity gradient is very small, the contribution of the noise is superior. The expanded nodule candidate region specifying unit 41 sets the voxels except the voxels representing the intensity gradient less than any cutoff value in the threshold determining target region to a threshold determining target region. An image 157 represents the threshold determining target region based on the image 156. The cutoff value is adequately determined in consideration of the noise standard deviation (for example, estimated in a portion of the image which is in contact with external air). The cutoff value is determined based on an experience, a simulation result or a testing result so as to obtain several times of the noise standard deviation.

In a step Sd3, the expanded nodule candidate region specifying unit 41 thresholding-processes the region of interest defined in the step Sd1 by the threshold intensity determined in the step Sd2 to obtain a two-value image. An image 158 is the two-value image obtained by thresholding-processing the image 151 by the threshold intensity determined based on information on the threshold determining target region shown in image 157. In the image 158, a white region and a gray region correspond to the region of interest. The voxel value of the voxel belonging to the white region is 1 and the voxel value of the voxel belonging to the gray region is 0. A black region represents a region except the region of interest. The expanded nodule candidate region specifying unit 41 sets only a voxel vale of the connection component which overlaps a region corresponding to the surface and the inside of the ellipsoidal model of the initial state to 1 and sets the other voxel value to 0 from the two-value image, thereby obtaining an image such as an image 159. In this image 159, a region having a voxel value of 1 is determined to a supplementary expanded nodule region.

In a step Sd4, the nodule candidate region specifying unit 42 generates a penalty image for generating the ellipsoidal model based on the image shown in the expanded nodule candidate region. That is, first, the nodule candidate region specifying unit 42 sets a parameter h to h=round (βN). Here, N is the initial radius of the ellipsoidal model. β is a positive parameter to be set previously and is set to be equal to or less than 0.5. The nodule candidate region specifying unit 42 sets each of the voxels in the region of interest to the center voxel, respectively, and checks whether a cubic region of which one side includes an array of 2h+1 voxels centered on the center voxel is in the region of interest. When the above-described cubic region is obtained, the nodule candidate region specifying unit 42 sets a ratio of voxels belonging to the expanded nodule candidate region in the cubic region of the lung region to p and sets a ratio of the voxels which do not belong to the expanded nodule candidate region to q. The nodule candidate region specifying unit 42 defines a value obtained by {1-2 min(p,q)} to the value of the center voxel in the penalty image. When the above-described cubic region is not obtained, the value of the center voxel in the penalty image is set to 1. Since p+q is 1, min(p,q) is always in a value of 0 to 0.5. When min(p,q) is 0.5, the voxel value is zero which is a minimum value, and, when min(p,q) is 0, the voxel value is 1 which is a maximum value. As the center voxel is close to the boundary between the expanded nodule candidate region and the outer region thereof, the min(p,q) increases. Accordingly, the penalty image becomes an image in which a valley of the intensity exists in the vicinity of the boundary between the expanded nodule candidate region and the outer region thereof. An image 160 is the penalty image obtained from the image 159.

In a step Sd5, the nodule candidate region specifying unit 42 deforms the ellipsoidal model using the penalty image. That is, the nodule candidate region specifying unit 42 deforms the initial shape of the ellipsoidal model determined in the step Sd1 to follow the valley of the intensity of the penalty image. The deformation of the ellipsoidal model can be embodied by the same process as the first embodiment. As a result, as shown in the image 160, it is possible to position the surface of the generated ellipsoidal model in the vicinity of the boundary of the expanded nodule candidate region with certainty.

Thereafter, the nodule candidate region specifying unit 42 specifies the nodule candidate region in the step Sa6, similar to the first embodiment. The nodule candidate region specifying unit 42 specifies only the expanded nodule candidate region as the nodule candidate region, instead of the whole image region surrounded by the generated ellipsoidal model obtained in the step Sd5.

In a step Sd6, the judging unit 43 calculates a diminution index. Hereinafter, the calculation of the diminution index will be described with reference to FIGS. 23 to 30.

Figure 23:
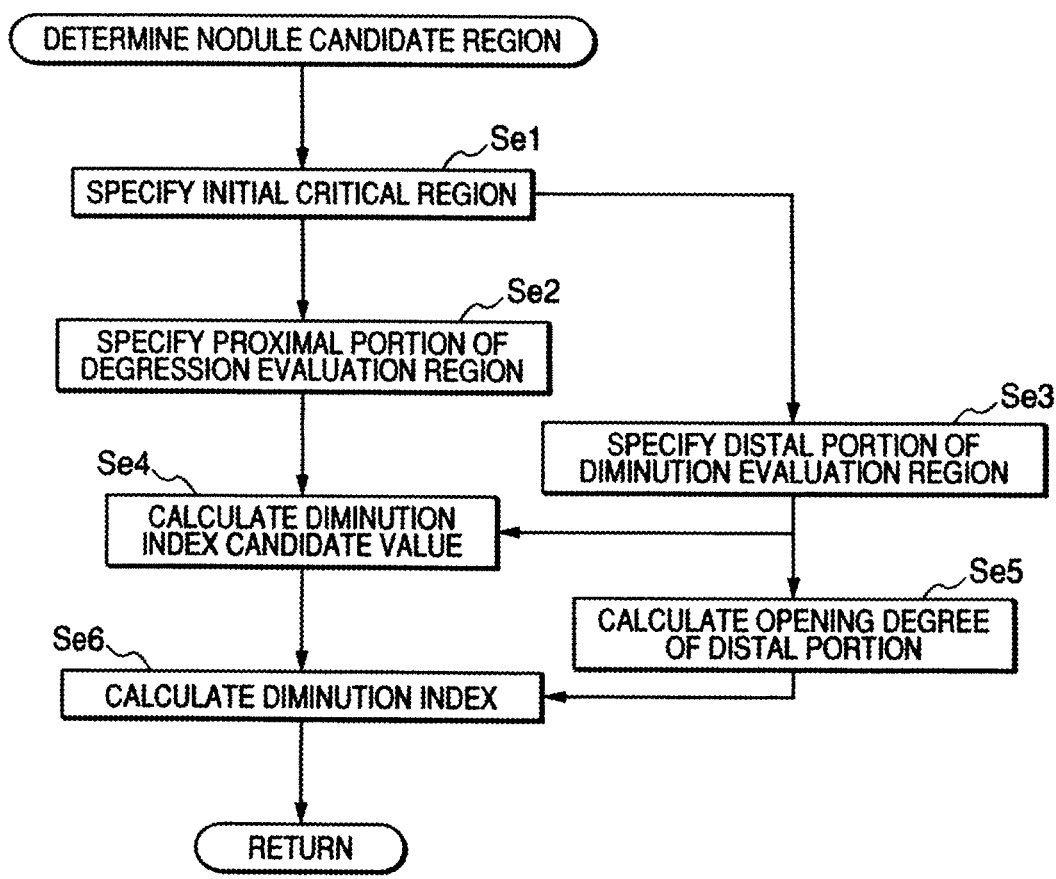
FIG. 23 is a flowchart showing a process of calculating diminution index by a judging unit shown in FIG. 20.

FIG. 23 is a flowchart showing a process of calculating the diminution index using the judging unit 43.

In the calculation of the diminution index, special region expansion called directional region expansion is used in specifying a distal portion of a diminution evaluation region. Since an initial region used in the directional region expansion is obtained as a partial set of an expanded nodule candidate region critical portion 104, the initial region is referred to as an initial critical region in the following description. A proximal portion of the diminution evaluation region is determined without using the region expansion.

When the expanded nodule candidate region critical portion is an empty set, the diminution index is set to 1. Otherwise, the diminution index is determined as follows.

In a step Se1, the judging unit 43 specifies the initial critical region of the nodule candidate region. The initial critical region exists in one nodule candidate region in plural.

The initial critical region is determined in one-to-one correspondence with the region having a maximum value in a work image by the following procedure. The work image is generated by setting the voxels belonging to the expanded nodule candidate region critical portion to the value of the voxel of the expanded nodule candidate region after the distance transformation and initializing the other voxels to 0.

The judging unit 43 generates a two-value image in which the value of the voxel having a maximum value in the work image is set to 1 and the values of the other voxels are set to 0. The judging unit 43 performs the following process with respect to the connection component of the two-value image.

(1) The judging unit 43 records the centroid of the connection component.

(2) The judging unit 43 performs region expansion including (2-1) to (2-5) using the connection component as the initial region.

(2-1) The judging unit 43 generates the two-value image having the same size as the work image to initialize the values of all the voxels to 0. The two-value image is used in storing the progressing state of the region expansion and is, hereinafter, referred to as an output region because the two-value image is output as the result of the region expansion when the procedure is finished. The judging unit 43 generates an empty list (hereinafter, referred to as a process voxel list).

(2-2) The judging unit 43 sets the value of the voxel in the output region to 1 and adds the voxel to the end of the process voxel list, with respect to each of the voxels belonging to the initial region.

(2-3) The judging unit 43 deletes a voxel located at a top of the process voxel list (hereinafter, referred to as an upstream voxel) from the process voxel list.

(2-4) A voxel which is adjacent to the upstream voxel and has a value of 0 in the output region is referred to as a downstream voxel. The judging unit 43 sets the value of the downstream voxel in the output region to 1 when the value of the work image in the downstream voxel is not 0 and is equal to or less than that of the work image in the upstream voxel with respect to each of the downstream voxels. The judging unit 43 adds the downstream voxel to the end of the process voxel list when the value of the work image in the downstream voxel is larger than 1.

(2-5) The judging unit 43 finishes the region expansion when the process voxel list is emptied. Otherwise, the judging unit 43 returns to the process of (2-3).

(3) The judging unit 43 sets a region obtained as the output of the region expansion to a new initial critical region. The judging unit 43 sets the value of the work image in the voxel belonging to the same region to 0. The centroid recorded in (1) becomes a representative point corresponding to the initial critical region determined therein.

The judging unit 43 repeats the processes (1) to (3) until the maximum value of the work image becomes 1.

When the peripheral region of the nodule candidate region exists in plural by these processes, the expanded nodule candidate region critical portion can be distinguished by the plurality of initial critical regions corresponding to the respective peripheral regions.

Figure 24:
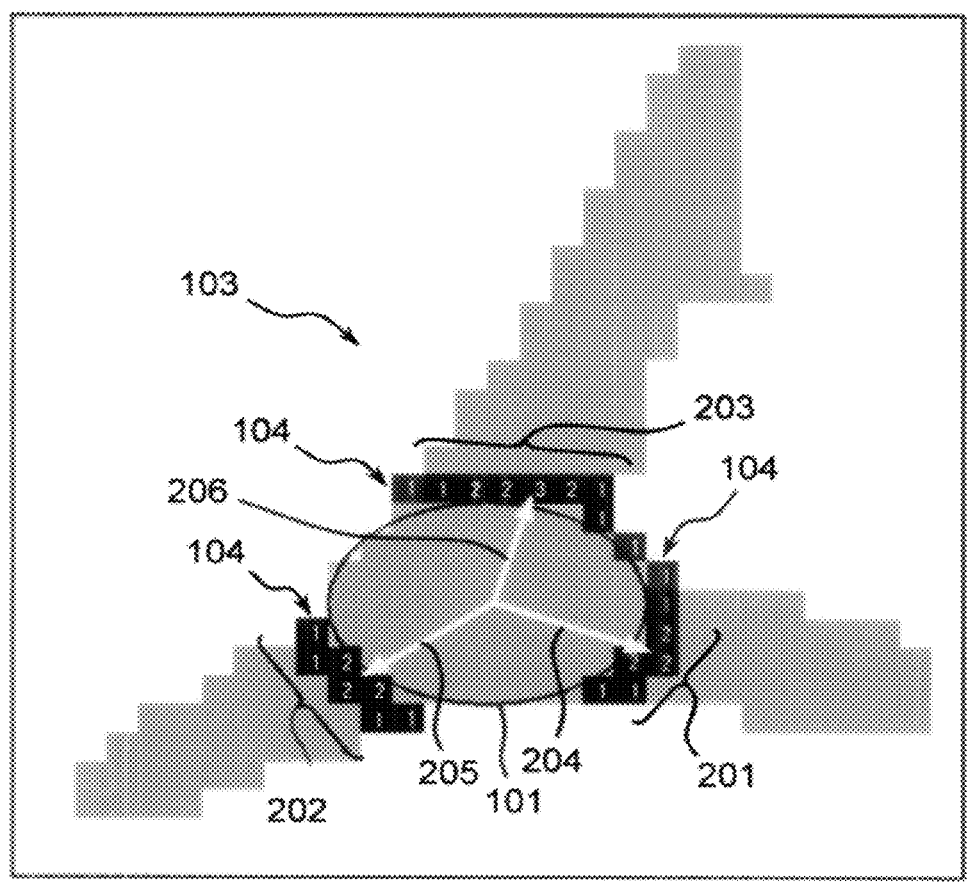
FIG. 24 is a view two-dimensionally showing an initial critical region.

FIG. 24 is a view two-dimensionally showing the initial critical region. In FIG. 24, the expanded nodule candidate region 103 is formed by all the voxels shown in gray color or black color. Among the voxels belonging to the expanded nodule candidate region 103, the voxels belonging to the expanded nodule candidate region critical portion 104 are marked with numerals. The numerals denote the value of the distance transformation using the chess board distance of the expanded nodule candidate region. In the example shown in FIG. 24, since three maximum values of the distance transformation exist in the expanded nodule candidate region critical portion, three initial critical regions 201, 202 and 203 are obtained as shown in FIG. 24. The voxels belonging to the initial critical regions 201, 202 and 203 are shown in dark black color. In FIG. 24, vectors 204, 205 and 206 from the center of the generated ellipsoidal model 101 to the representative points of the initial threshold regions 201, 202 and 203 are shown.

In a step Se2, the judging unit 43 specifies the proximal portion of the diminution evaluation region with respect to each of the initial critical regions. That is, the judging unit 43 determines that the voxel belongs to the proximal portion when an inner product between a vector from the center of the generated ellipsoidal model to the voxel and a vector from the center of the generated ellipsoidal model to the representative point of the initial critical region is not negative, with respect to each of the voxels which belong to the expanded nodule candidate region and are located in the generated ellipsoidal model. By this process, among the regions obtained by bisecting the nodule candidate region as the proximal portion of the diminution evaluation region in a plane which is perpendicular to the representative direction and passes through the center of the generated ellipsoidal model, a region located in the same direction as the representative direction is specified as the proximal portion of the diminution evaluation region.

Figure 25:
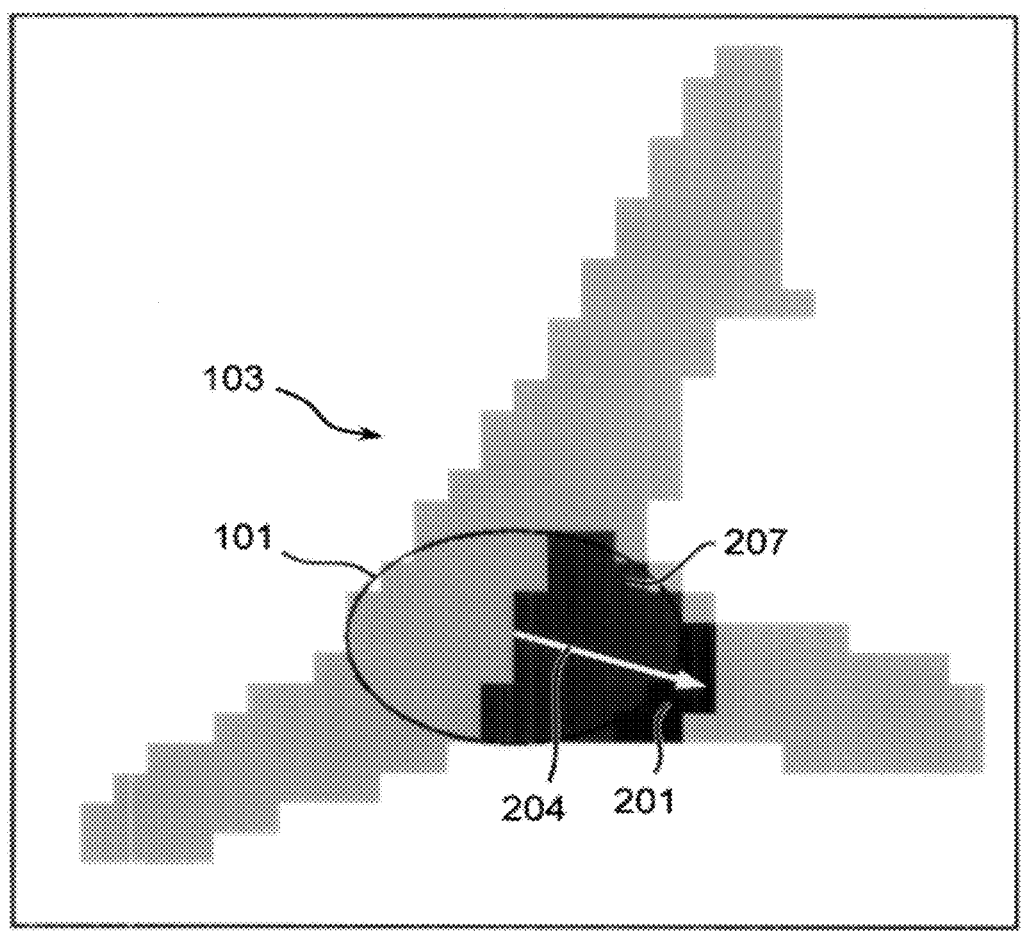
FIG. 25 is a view showing a proximal portion of a diminution evaluation region corresponding to the initial critical region shown in FIG. 24.

FIG. 25 is a view showing the proximal portion of the diminution evaluation region corresponding to the initial critical region 201 shown in FIG. 24. A region shown in dark gray color in FIG. 25 is the proximal portion 207 of the diminution evaluation region.

In a step Se3, the judging unit 43 specifies the distal portion of the diminution evaluation region with respect to each of the initial critical regions. That is, the judging unit 43 specifies the distal portion of the diminution evaluation region by performing following directional region expansion based on each of the initial critical region.

In the directional region expansion, four parameters including a center position, a representative direction, an allowable angle and an upper limit projection distance are used. The center position is the center position of the generated ellipsoidal model. The representative direction is a direction from the center position to the representative point of the initial critical region. The allowable angle is an angle for defining a direction for allowing the region expansion and is a predetermined integer. The upper limit projection distance is a distance representing a range for allowing the region expansion and is, for example, set to twice the radius of the generated ellipsoidal model in the representative direction. The parameters except the allowable angle are automatically set by the judging unit 43 in correspondence with the nodule candidate region. The center position may be the vicinity of the center of the generated ellipsoidal model or the center position of the nodule candidate region, similar to the first embodiment. The representative direction may substantially follow a direction for satisfying the above-described condition or be separated from the center position or the representative point.

Hereinafter, a procedure of expanding the direction region will be described.

(4) The judging unit 43 generates a two-value image having the size including the expanded nodule candidate region to initialize the values of all the voxels to 0. The two-value image is used in storing the progressing state of the direction region expansion and is, hereinafter, referred to as an output region because the two-value image is output as the result of the directional region expansion when the procedure is finished. The judging unit 43 generates an empty list.

(5) The judging unit 43 sets the value of the voxel in the output region to 1 when an angle between a vector from the center position to the voxel and the representative direction is within the allowable angle and adds the voxels to the end of the process voxel list, with respect to each of the voxels belonging to the initial critical region.

(6) The judging unit 43 deletes a voxel located at a top of the process voxel list (hereinafter, referred to as an upstream voxel) from the process voxel list.

(7) A voxel which is adjacent to the upstream voxel and has a value of 0 in the output region is referred to as a downstream voxel. The judging unit 43 sets the value of the downstream voxel in the output region to 1 and adds the downstream voxel to the end of the process voxel list when the downstream voxel satisfies all the following conditions (a) to (c), with respect to each of the downstream voxels.

(a) The downstream voxel belongs to the expanded nodule candidate region.

(b) An angle between the vector from the upstream voxel to the downstream voxel and the representative direction is within the allowable angle.

(c) The projection length of a segment for joining the center position and the voxel in a straight line of the representative direction which passes through the center position is equal to or less than the upper limit projection distance.

(8) The judging unit 43 finishes the direction region expansion when the process voxel list is emptied. Otherwise, the judging unit 43 returns to the process of (6).

By this process, a fan-shaped region which has center angles having the allowable angle from the center of the generated ellipsoidal model to the both sides of the representative direction and a radius which is the upper limit projection distance and a region generated by the voxel commonly belonging to the expanded nodule candidate region except the nodule candidate region are specified as the distal portion of the diminution evaluation region.

Figure 26:
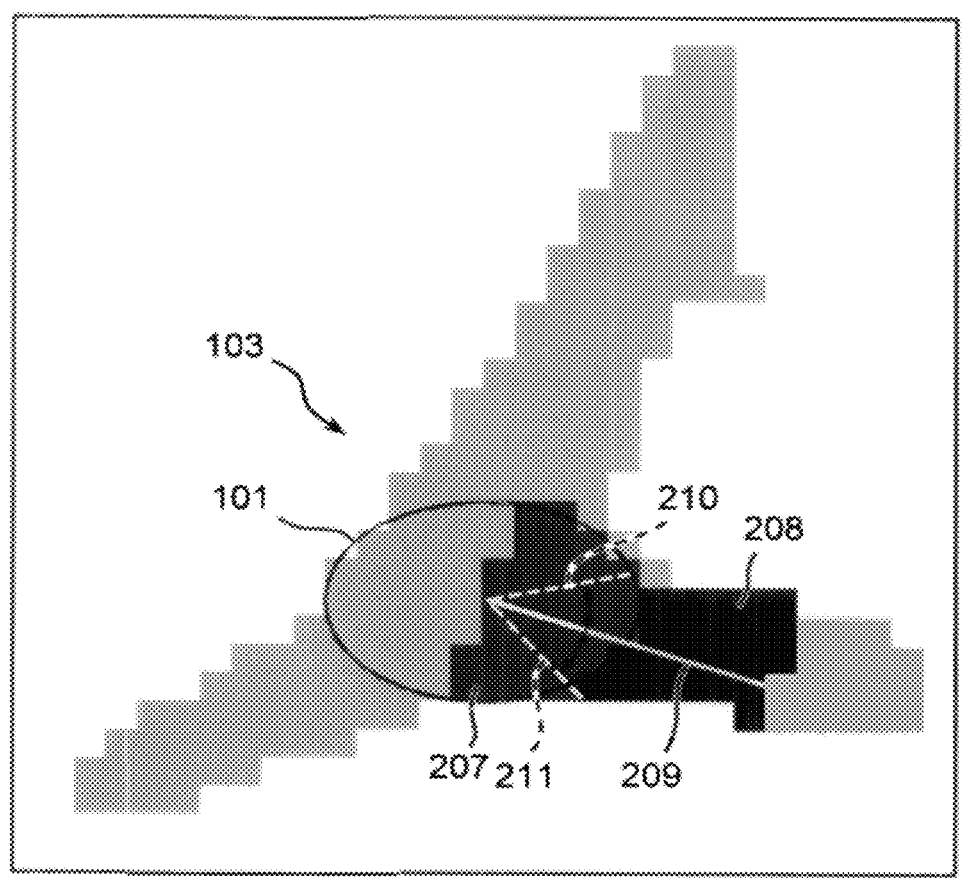
FIG. 26 is a view showing a distal portion of the diminution evaluation region specified by directionally expanding the initial critical region shown in FIG. 25.

FIG. 26 is a view showing the distal portion of the diminution evaluation region specified by performing the directional region expansion on the initial critical region 201 shown in FIG. 25. A region shown in black color in FIG. 26 is the distal portion 208 of the diminution evaluation region. A segment 209 is a straight line of the representative direction which passes through the center position and the length thereof is the upper limit projection distance. Dotted lines 210 and 211 denote directions which form the allowable angles with the representative direction.

In a step Se4, the judging unit 43 calculates diminution index candidate value corresponding to each of the distal portions of the diminution regions. The judging unit 43 subtracts "1" from the volume ratio of the distal portion of the diminution evaluation region to the proximal portion of the diminution evaluation region to obtain the diminution index candidate value. The respective volumes of the distal portion of the diminution evaluation region and the proximal portion of the diminution evaluation region can be calculated based on the volumes of the voxels and the numbers of the respective voxels belonging thereto because the numbers of the respective voxels belonging thereto are known.

When a segment 209 is an observation line of the first embodiment, a ratio of the total sum of the expanded nodule candidate region sections in the ellipsoidal model accumulated in the first adder and the second adder is approximate to the ratio of the volumes of the proximal portion of the diminution evaluation region and the distal portion of the diminution evaluation region. That is, the diminution degree candidate value is the feature quantity which is equivalent to the diminution index of the first embodiment.

In a step Se5, the judging unit 43 obtains the opening degree of the distal portion with respect to each of the distal portions of the diminution evaluation region as follows. That is, the diminution degree candidate value one-to-one corresponds to the opening degree of the distal portion.

Among the voxels belonging to any region, a set of voxels which is in contact with the voxel which does not belong to the region by 6-connectivity is defined as a surface region of the region. The judging unit 43 sets the number of the voxels belonging to a region obtained by excluding a proximal end or a distal end of the distal portion of the diminution evaluation region from the surface region of the distal portion of the diminution evaluation region to P and sets the number of the voxels belonging to the surface region of the expanded nodule candidate region to Q. The judging unit 43 obtains the opening degree of the distal portion by |P∪Q|/|P|. When P is an empty set (ϕ), the judging unit 43 sets the opening degree of the distal portion to 1.

Figure 27:
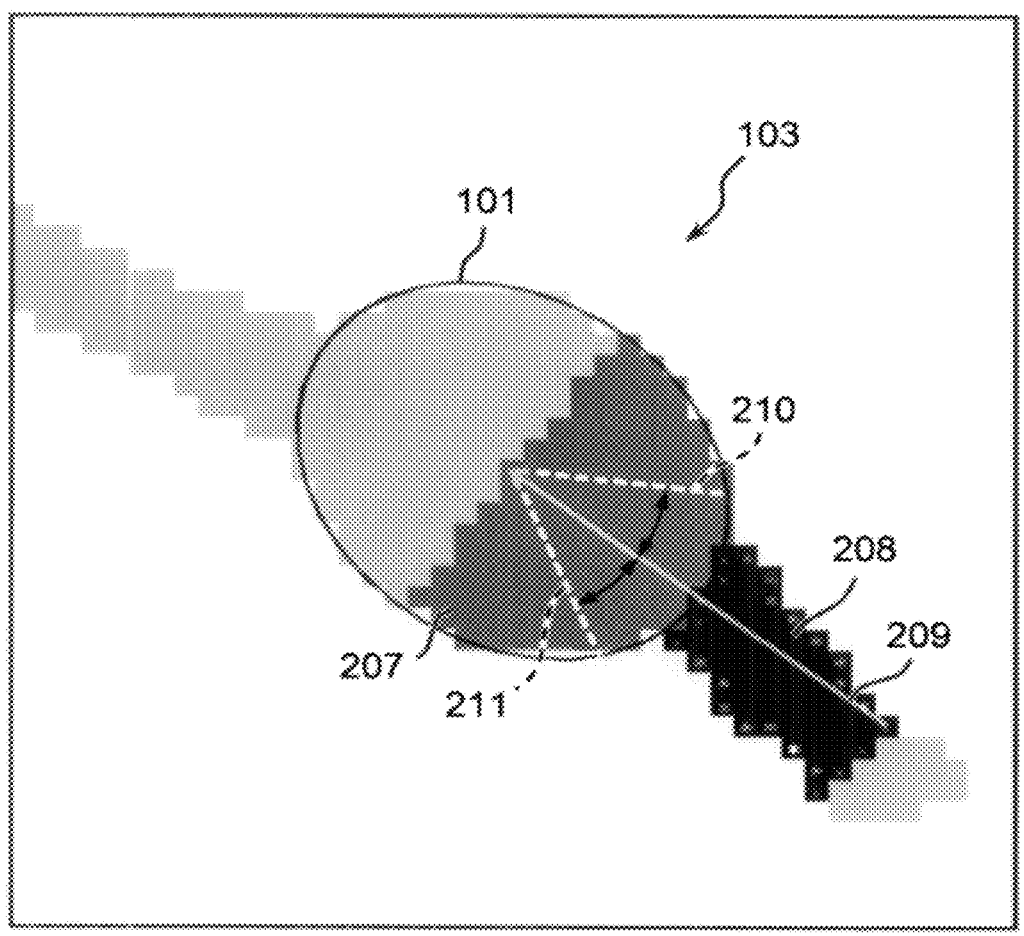
FIG. 27 is a view showing a voxel corresponding to a surface region in the distal portion of the diminution region.
Figure 28:
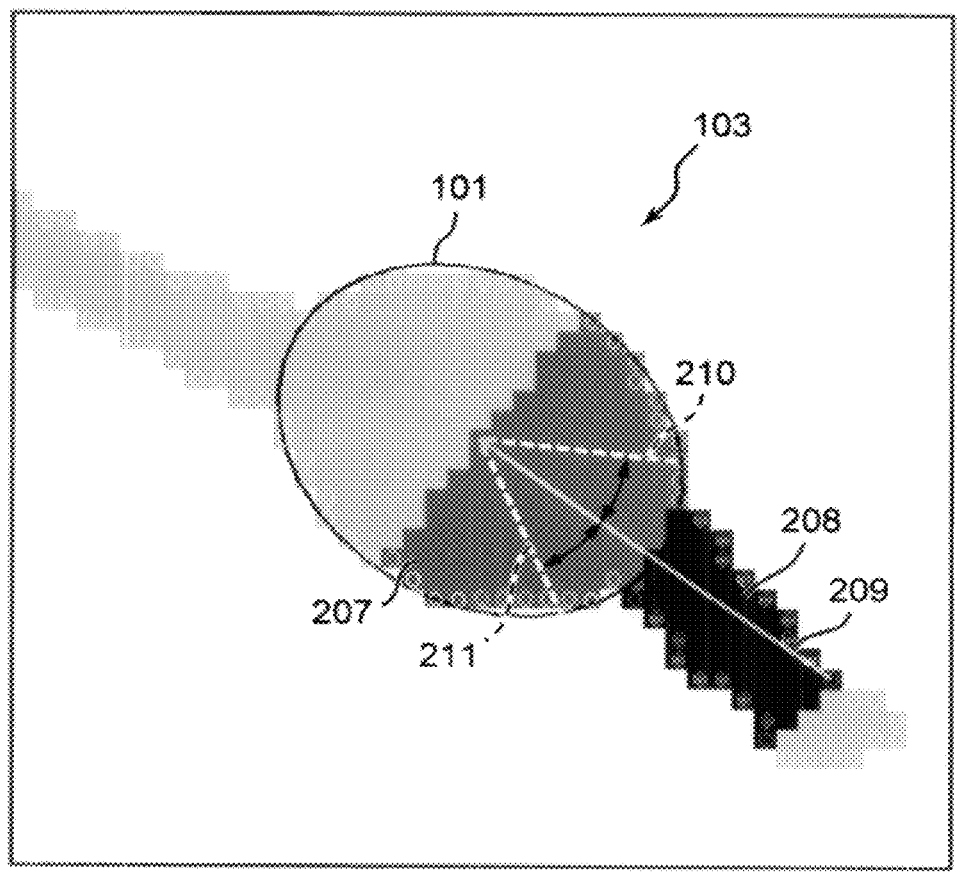
FIG. 28 is a view showing voxels corresponding to a surface region in the expanded nodule candidate region.

A form for attaching the nodule to the blood vessel is roughly classified into a first form for surrounding the blood vessel by the nodule and a second form for attaching the nodule to the lateral side of the blood vessel. FIGS. 27 and 28 show an example of the first form and FIGS. 29 and 30 show an example of the second form.

Figure 29:
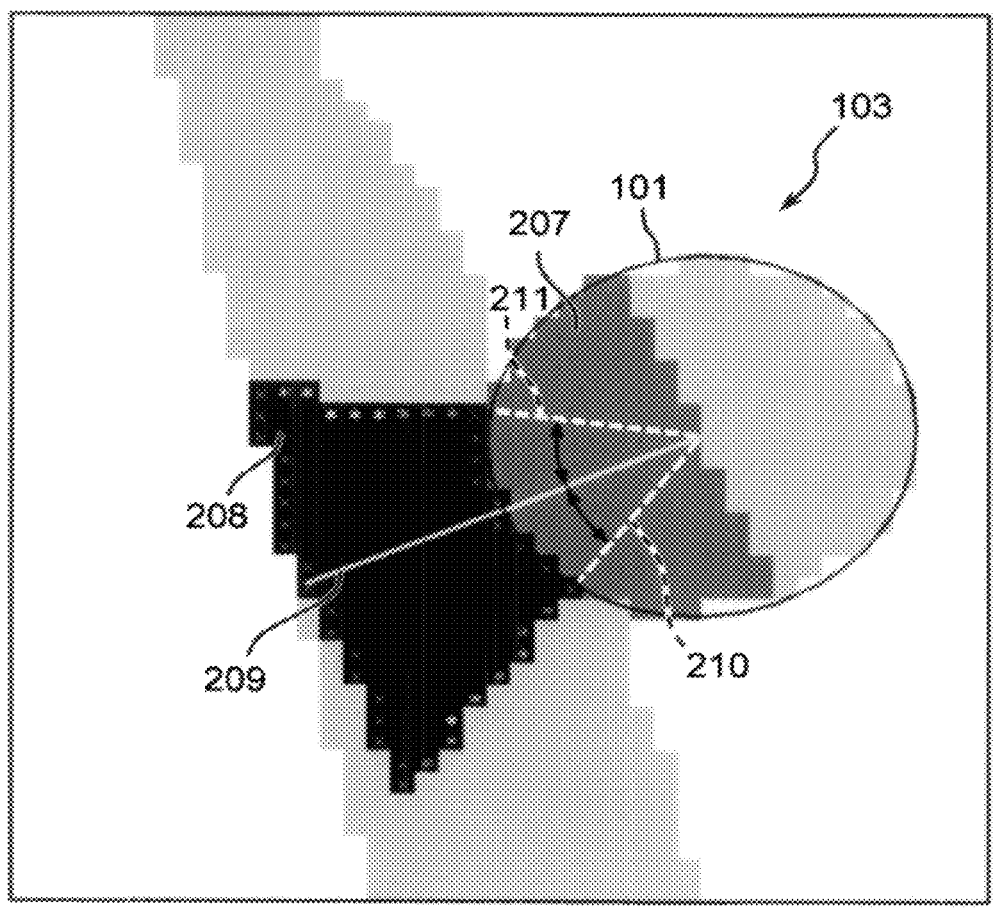
FIG. 29 is a view showing voxels corresponding to a surface region in the distal portion of the diminution evaluation region.
Figure 30:
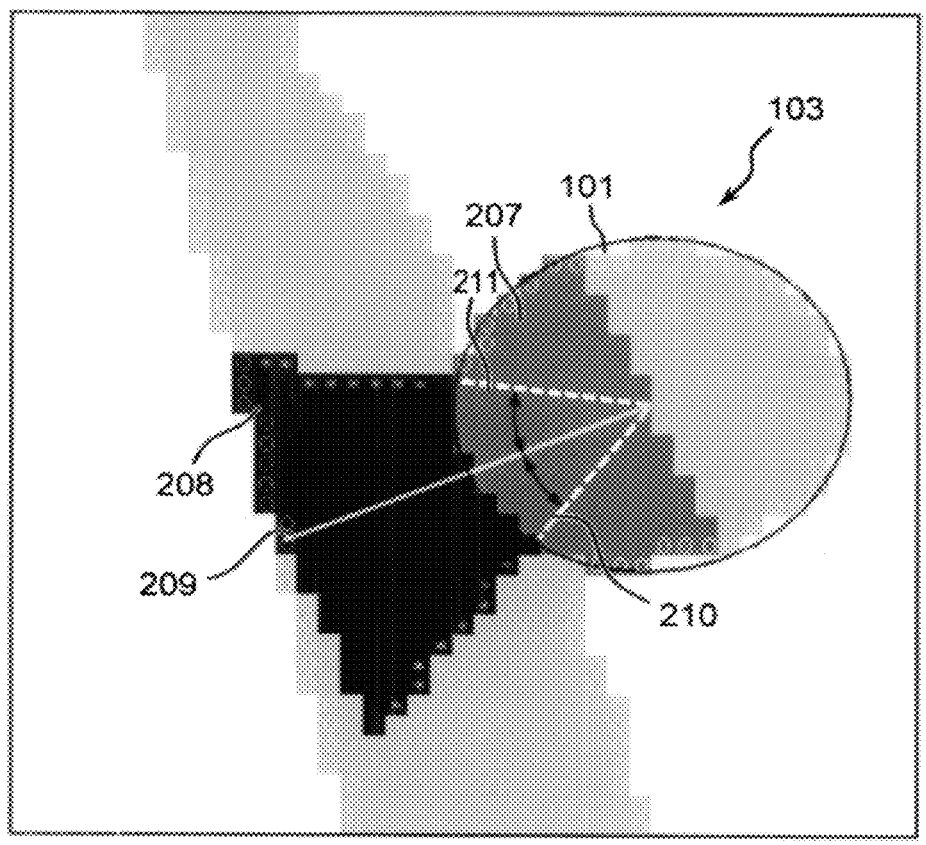
FIG. 30 is a view showing voxels corresponding to a surface region in the expanded nodule candidate region.

In FIG. 27 or 29, a voxel marked with an asterisk and a voxel marked with x belong to the surface region of the distal portion of the diminution evaluation region. The voxel marked with x belongs to the proximal end or the distal end of the distal portion of the diminution evaluation region. Accordingly, the number of the voxels marked with the asterisk is P. In FIGS. 28 and 30, a voxel marked with O belongs to the surface region of the expanded nodule candidate region. Accordingly, the number of the voxels marked with O is Q.

In the first form, the representative direction of the directional region expansion is substantially equal to the axial direction of the blood vessel. Accordingly, when there is the allowable angle to some extent, P⊂Q. That is, P∪Q (the number of the voxels of the region marked with both the asterisk and O in FIG. 28) becomes equal to P and the opening degree of the distal portion becomes 1. In the second form, as can be seen from FIG. 30, P∪Q=ϕ and the opening degree of the distal portion becomes 0.

It can be estimated to which of the first and second forms the form for attaching the nodule to the blood vessel based on the opening degree of the distal portion calculated above is close. As the form is close to the first form, the representative direction of the directional region expansion is suitable for obtaining the diminution index candidate value. In the step Se6, the judging unit 43 sets a minimum value of the diminution index candidate values in which the opening degree of the distal portion is equal to or larger than a predetermined cutoff value among the diminution index candidate value corresponding thereto as the diminution index, with respect to each of the nodule candidate regions. The cutoff value is set to an intermediate value between the minimum value 0 and the maximum value 1, that is, about 0.5.

Thereafter, in a step Sa10, the judging unit 13 judges whether the nodule candidate region is the nodule, based on the diminution index obtained above, similar to the first embodiment.

According to the third embodiment, it is possible to accurately detect any one of the solid nodule and the GGO as the nodule.

Fourth Embodiment

A result of judging the nodule according to the third embodiment is generally confirmed on the image by the image reading doctor.

Figure 31:
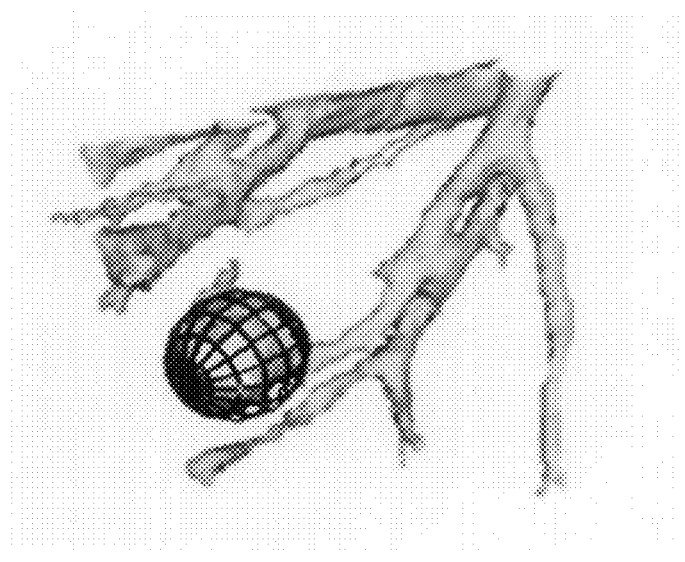
FIG. 31 is a view showing an example of graphic-overlay-displaying a generated ellipsoidal model in a display method called as a wireframe to surround a nodule, in an image which a nodule and a peripheral structure of the nodule are displayed using the volume rendering technology.
Figure 32:
FIG. 32 is a view showing an example of displaying the distal portion of the diminution evaluation region and the proximal portion of the diminution evaluation region in brightness or colors in the image which the nodule and the peripheral structure of the nodule are displayed using the volume rendering technology.

Accordingly, in order to confirm the image, the nodule and the peripheral structure of the nodule are displayed using a volume rendering technology. At this time, as shown in FIG. 31, the generated ellipsoidal model used in calculating the diminution index is graphic-overlay-displayed by a display method called a wireframe to surround a nodule. As shown in FIG. 32, the distal portion of the diminution evaluation region and the proximal portion of the diminution evaluation region are displayed in brightness or colors such that the boundary between the nodule and the peripheral structure of the nodule can be clearly confirmed.

Figure 33:
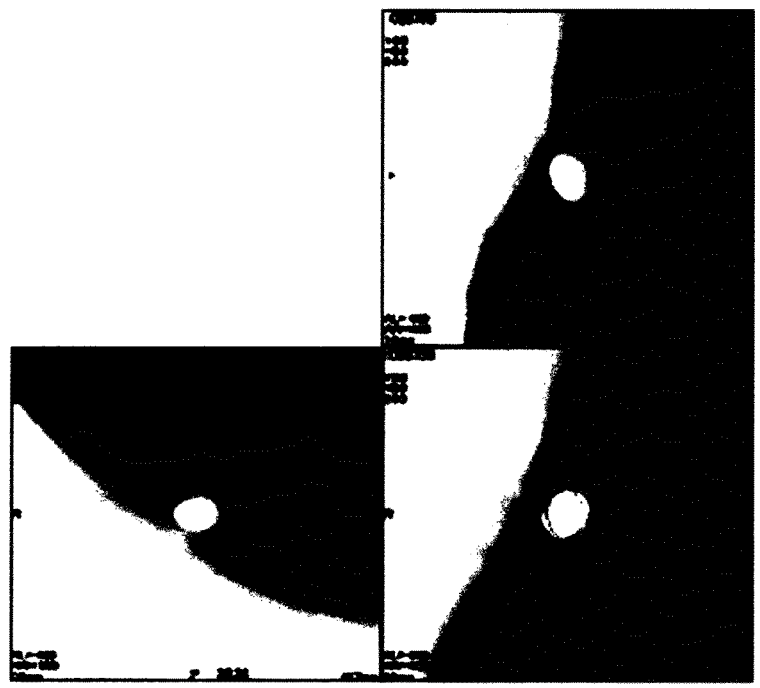
FIG. 33 is a view showing an example of displaying a two-dimensional ellipsoid which is an intersection between the generated ellipsoid and each section on a MPR section of three perpendicular sections.

In the display of the nodule and the peripheral structure of the nodule, a surface display mode using surface rendering may be performed. When the internal structure of the nodule need be observed, a two-dimensional ellipse which is an intersection between a generated ellipse and each section may be displayed on the MPR (Axial, Sagittal, Coronal) section of three perpendicular sections, as shown in FIG. 33.

The present invention is not limited to the above-described embodiments and may be embodied by changing the components without departing from the spirit of the present invention.

In the first embodiment, an area may be used as the feature quantity. The area of the expanded nodule candidate region section in the ellipsoidal model from the start point to the end point of the search reference point in the observation plane 109 is obtained to obtain an area diminution index of a place which has a ratio of the area of the expanded nodule candidate region section in the ellipsoidal model in the centrifugal direction to the area of the expanded nodule candidate region section in the ellipsoidal model at the start point. It is determined whether the nodule candidate region is the nodule by referring to the area diminution index. For example, when the nodule candidate region is the nodule as shown in FIGS. 34 and 35, the expanded nodule candidate region sections in the ellipsoidal models of the observation planes 109a, 109b, 109c and 109d of FIG. 34(*a*) have shapes shown in FIGS. 34(*b*) to 34(*e*), respectively. The area diminution index of the expanded nodule candidate region section in the ellipsoidal model has a property shown in FIG. 34(*f*). When the nodule candidate region is the lung blood vessel, the expanded nodule candidate region sections in the ellipsoidal models of the observation planes 109e, 109g, 109g and 109h of FIG. 35(*a*) have shapes shown in FIGS. 35(*b*) to 35(*e*), respectively. The area diminution index of the expanded nodule candidate region section in the ellipsoidal model has a property shown in FIG. 35(*f*). Accordingly, the area diminution index may be used instead of the diminution index used in the first embodiment.

In the first embodiment, a product of the volume of the observation plane and the pixel value of the image in an original observation plane may be used as the feature quantity. That is, for example, the area of the expanded nodule candidate region section in the ellipsoidal model is added to the first adder and the second adder to add a product of the area of the pixel of the section and the pixel value corresponding thereto.

In the first embodiment, with respect to only the connecting region other than the generated ellipsoid, the product of the volume of the observation plane and the pixel value of the image in an original observation plane may be used as the feature quantity. That is, with respect to only the second adder, the area of the expanded nodule candidate region section in the ellipsoidal model is added to only the second adder is changed to add a product of the area of the pixel of the section and the pixel value corresponding thereto.

Figure 36:
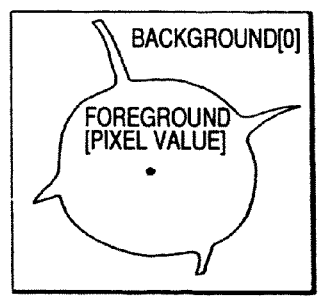
FIG. 36 is a view showing a modified example of assignment of a voxel value.

In the second embodiment, the added value of the pixel value may be used as the feature quantity. For example, as shown in FIG. 36, the pixel value of the original three-dimensional image is assigned to the voxel belonging to the foreground portion as the voxel value and "0" is assigned to the voxel belonging to the background portion as the voxel value. Thereafter, the voxel value is added in the calculation of the area of the expanded nodule candidate region section in the ellipsoidal model of the first embodiment or the calculation of the foreground occupancy ratio of the second embodiment.

In the second embodiment, the pixel value of the original image may be assigned to only the voxels of the connecting region other than the generated ellipse in the foreground portion. That is, all the volumes of the voxels of the ellipsoid which sequentially enlarges are added and the product of the pixel value is added in the ellipsoid having the axial length larger than that of the ellipsoidal model generated by the nodule candidate region specifying unit 11.

Figure 37:
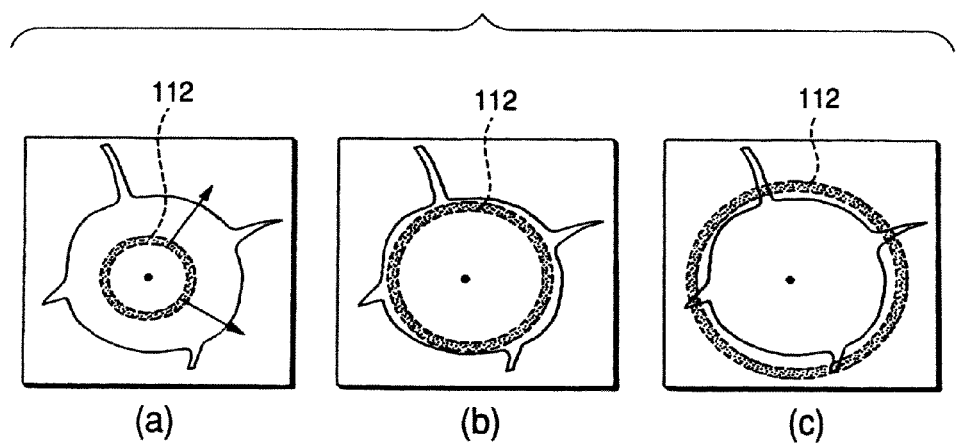
FIG. 37 is a view showing an ellipsoidal shell of a region of which the foreground occupancy ratio will be calculated, according to a modified example.

In the second embodiment, as shown in FIG. 37, the inside of an ellipsoid shell 112 between two ellipsoidal models having different sizes may be a region of which the foreground occupancy ratio will be calculated. The thickness of the ellipsoidal shell 112 may be, for example, equal to or larger than the thickness of one voxel.

The method of calculating the diminution index in the third embodiment may be replaced with the process of specifying the search reference point and calculating the diminution index of FIG. 2 in the first embodiment. On the contrary, the process of specifying the search reference point and calculating the diminution index of FIG. 2 in the first embodiment may be replaced with the method of calculating the diminution index in the third embodiment.

The method of narrowing the diminution index candidate value based on the opening degree in the third embodiment is applicable to the process of calculating the diminution index in the first embodiment.

Although the judgment of the nodule-shaped abnormality in the lung cancer is described in the embodiments, the method of the present invention is applicable to wen-shaped abnormality connecting to the blood vessel such as cerebral aneurysm which is cerebrovascular accident.

Although the three-dimensional image acquired by the multi-slice CT 2 is processed in the embodiments, a three-dimensional image acquired using the other diagnostic modality such as an X-ray diagnostic device, a magnetic resonance imaging device or an ultrasonic diagnostic device may be processed.

A nodule candidate region specified by a user may be judged, instead of automatically specifying the nodule candidate region.

Various inventions may be made by a combination of a plurality of components disclosed in the embodiments. Several components may be deleted from all the components of the embodiments. The components of the different embodiments may be properly combined.

According to the present invention, it is possible to judge whether an abnormal candidate region included in an image representing the inside of a subject is anatomic abnormality such as a nodule with high accuracy.

What is claimed is:

1. An image diagnostic processing device configured to judge whether an anatomic abnormal region exists in an image representing the inside of a subject, the device comprising:
   a processing unit configured to determine a threshold value for determining an abnormal candidate region including a ground glass opacity and to perform a thresholding-process with respect to the image using the determined threshold value to obtain a two-value image;
   a generating unit configured to generate a penalty image from the two-value image; and
   a determining unit configured to fit a spherical or ellipsoidal model to the penalty image to determine the abnormal candidate region including the ground glass opacity.

2. The image diagnostic processing device according to claim 1, wherein the generating unit is configured to generate the penalty image, which is an image in which an intensity valley exists in the vicinity of a boundary between an expanded nodule candidate region represented in the two-value image and an outer region thereof.

3. The image diagnostic processing device according to claim 1, wherein the generating unit is configured to generate the penalty image, which is an image obtained by using a value according to a ratio of the voxels belonging to an expanded nodule candidate region in a predetermined region.

4. The image diagnostic processing device according to claim 1, wherein the generating unit is configured to generate the penalty image, which is an image obtained by using a value according to a ratio of the voxels not belonging to an expanded nodule candidate region in a predetermined region.

5. The image diagnostic processing device according to claim 3, wherein the generating unit is configured to generate the penalty image, which is an image obtained by using a value according to a ratio of the voxels not belonging to an expanded nodule candidate region in the predetermined region.

6. The image diagnostic processing device according to claim 1, wherein the processing unit is configured to determine the threshold value for the thresholding-process based on information of a threshold determining target region obtained by using the image and the ellipsoidal model.

7. The image diagnostic processing device according to claim 1, wherein the processing unit is configured to determine the threshold value for the thresholding-process based on information of a threshold determining target region obtained by excluding a high contrast region in the image.

8. The image diagnostic processing device according to claim 1, wherein the processing unit is configured to determine the threshold value for the thresholding-process based on information of a threshold determining target region obtained by excluding a region representing intensity gradient less than a predetermined cutoff value.

9. The image diagnostic processing device according to claim 1, further comprising:
   a unit configured to obtain a variation of an occupancy based on information of the abnormal candidate region determined by the determining unit.

10. The image diagnostic processing device according to claim 1, further comprising:
    a unit configured to obtain an area diminution index based on information of the abnormal candidate region determined by the determining unit.

11. The image diagnostic processing device according to claim 1, wherein the processing unit is configured to perform the thresholding process with respect to the image, which is a three-dimensional image.

12. An image diagnostic processing device configured to judge whether an anatomic abnormal region exists in an image representing the inside of a subject, the device comprising:
- a processing unit configured to perform a thresholding-process with respect to the image to obtain a two-value image;
- a generating unit configured to generate an image based on a ratio of the voxels belonging to an expanded nodule candidate region to the voxels not belonging thereto in a predetermined region in the two-value image; and
- a determining unit configured to fit a spherical or ellipsoidal model to the image generated by the generating unit to determine an abnormal candidate region including ground glass opacity.

13. An image diagnostic processing device configured to judge whether an anatomic abnormal region exists in an image representing the inside of a subject, the device comprising:
- a processing unit configured to perform a thresholding-process with respect to the image to obtain a two-value image;
- a generating unit configured to generate a penalty image from the two-value image; and
- a determining unit configured to fit a spherical or ellipsoidal model to the penalty image to determine an abnormal candidate region including ground glass opacity,
- wherein the penalty image is an image in which an intensity valley exists in the vicinity of a boundary between an expanded nodule candidate region represented in the two-value image and an outer region thereof.

14. An image diagnostic processing device configured to judge whether an anatomic abnormal region exists in an image representing the inside of a subject, the device comprising:
- a processing unit configured to perform a thresholding-process with respect to the image to obtain a two-value image;
- a generating unit configured to generate a penalty image from the two-value image; and
- a determining unit configured to fit a spherical or ellipsoidal model to the penalty image to determine an abnormal candidate region including ground glass opacity,
- wherein the penalty image is an image obtained by using a value according to a ratio of the voxels belonging to an expanded nodule candidate region in a predetermined region.

15. An image diagnostic processing device configured to judge whether an anatomic abnormal region exists in an image representing the inside of a subject, the device comprising:
- a processing unit configured to perform a thresholding-process with respect to the image to obtain a two-value image;
- a generating unit configured to generate a penalty image from the two-value image; and
- a determining unit configured to fit a spherical or ellipsoidal model to the penalty image to determine an abnormal candidate region including ground glass opacity,
- wherein the penalty image is an image obtained by using a value according to a ratio of the voxels not belonging to an expanded nodule candidate region in a predetermined region.

* * * * *